United States Patent [19]

Adachi

[11] Patent Number: 6,111,982
[45] Date of Patent: Aug. 29, 2000

[54] IMAGE PROCESSING APPARATUS AND RECORDING MEDIUM RECORDING A PROGRAM FOR IMAGE PROCESSING

[75] Inventor: Yasushi Adachi, Nara, Japan

[73] Assignee: Sharp Kabushiki Kaisha, Osaka, Japan

[21] Appl. No.: 09/140,745

[22] Filed: Aug. 26, 1998

[30] Foreign Application Priority Data

Sep. 11, 1997 [JP] Japan ................................. 9-247335

[51] Int. Cl.$^7$ ........................................................... G06K 9/00
[52] U.S. Cl. ................................................ 382/176; 382/175
[58] Field of Search .................................. 382/173, 174, 382/175, 176, 177, 178, 179, 180, 181, 182, 183, 184, 185; 358/456, 462, 453, 466, 464, 261, 454

[56] References Cited

U.S. PATENT DOCUMENTS

| | | | |
|---|---|---|---|
| 4,722,008 | 1/1988 | Ibaraki et al. . | |
| 4,786,820 | 11/1988 | Ogino et al. . | |
| 4,893,188 | 1/1990 | Murakami et al. | 358/456 |
| 4,907,285 | 3/1990 | Nakano et al. | 382/48 |
| 5,001,767 | 3/1991 | Yoneda et al. | 382/50 |
| 5,016,118 | 5/1991 | Nannichi . | |
| 5,101,283 | 3/1992 | Seki et al. | 358/456 |
| 5,195,147 | 3/1993 | Ohta | 382/21 |
| 5,231,677 | 7/1993 | Mita et al. . | |
| 5,345,517 | 9/1994 | Katayama et al. | 382/54 |
| 5,448,654 | 9/1995 | Katayama et al. | 382/298 |
| 5,587,808 | 12/1996 | Hagihara et al. | 358/462 |
| 5,701,364 | 12/1997 | Kanno | 382/176 |
| 5,729,627 | 3/1998 | Mizuno et al. | 382/173 |
| 5,784,488 | 7/1998 | Kuwata | 382/176 |
| 5,787,195 | 7/1998 | Tsujimoto et al. | 382/176 |
| 5,867,593 | 2/1999 | Fukuda et al. | 382/176 |
| 5,909,505 | 6/1999 | Katayama et al. | 382/164 |

FOREIGN PATENT DOCUMENTS

| | | |
|---|---|---|
| 100811A2 | 2/1984 | European Pat. Off. . |
| 710004A2 | 5/1996 | European Pat. Off. . |
| 63-246076 | 10/1988 | Japan . |
| 125857 | 5/1996 | Japan . |

*Primary Examiner*—Bijan Tadayon
*Assistant Examiner*—Amir Alavi

[57] ABSTRACT

A first feature parameter calculating circuit outputs, as a variable of a first feature parameter, a difference between a maximum value and a minimum value of signal levels of pixels calculated in a local block having a target pixel at a center. A second feature parameter calculating circuit determines sums of differences in signal level in the local block, along a direction in which the pixels are arranged, and outputs, as a variable of a second feature parameter, a minimum value of the sums. A third feature parameter calculating circuit binarizes the pixels in the local block, and counts the number of succeedingly arranged pixels having equal density, for example, along a main scanning direction, and calculates a difference between a maximum value and a minimum value of the numbers counted. In the same manner, a difference is also calculated along a sub scanning direction, and larger of two differences is outputted as a variable of a third feature parameter. A judging circuit categorizes each variable multi-dimensionally so as to discriminate a region including the target pixel.

28 Claims, 13 Drawing Sheets

FIG. 14

| 0 | -1 | 0 |
|---|----|---|
| -1 | 5 | -1 |
| 0 | -1 | 0 |

FIG. 15

| 1/16 | 1/16 | 1/16 |
|------|------|------|
| 1/16 | 8/16 | 1/16 |
| 1/16 | 1/16 | 1/16 |

FIG.16

| -6/32 | -3/32 | -5/32 | -3/32 | -6/32 |
|---|---|---|---|---|
| -3/32 | 7/32 | 10/32 | 7/32 | -3/32 |
| -5/32 | 10/32 | 32/32 | 10/32 | -5/32 |
| -3/32 | 7/32 | 10/32 | 7/32 | -3/32 |
| -6/32 | -3/32 | -5/32 | -3/32 | -6/32 |

IMAGE PROCESSING APPARATUS AND RECORDING MEDIUM RECORDING A PROGRAM FOR IMAGE PROCESSING

FIELD OF THE INVENTION

The present invention relates to an image processing apparatus for judging a feature of each pixel, for use in a device, such as a digital copying machine and a facsimile device, which processes an image signal representing a plurality of pixels, and to a recording medium recording a program for such a process.

BACKGROUND OF THE INVENTION

Conventionally, an image processing apparatus such as a digital copying machine and a facsimile processes a document composed of a character region, a photographic region, or a halftone dot region, or a document composed of a mixture of such regions. The image processing apparatus reads a document including such regions using an image sensor such as CCD (Charge Couples Device), and converts the document thus read into an image signal.

Further, the image processing apparatus carries out image processing so as to improve the image quality of a recorded image obtained from the image signal. For example, when the image is characters, an enhancement process is carried out to enhance the edges of the image, and when the image is halftone dots, a smoothing process is carried out so as to prevent moire. Also, when the image is characters, it is a common practice to carry out a process for converting the image into a character code.

In either process, it is often the case that an appropriate image process differs for each of the different types of an image, and in order to improve the image quality of the recorded image, the image process needs to be carried out in accordance with the type of the image.

As a conventional technique for improving the image quality using a filtering process, for example, the image processing apparatus as disclosed in Japanese Examined Patent publication No. 21384/1993 (Tokukohei 5-21384) is available. In this image processing apparatus, an image signal which has been smoothed and an image signal which has been enhanced are combined or selected by the output of the image signal from edge component detecting means so as to be outputted.

Also, for example, in a filter processing device as disclosed in Japanese Unexamined Patent publication No. 246076/1988 (Tokukaisho 63-246076), when the edge component of the image signal is not extracted by edge extracting means, a signal which has been subjected to a filtering process for removing a halftone dot component is selected, and when the edge component is extracted, a signal which has not been subjected to a filtering process is selected.

However, discrimination of image types by detection of the edge component alone is not sufficient, and there is a need for discriminating whether the image belong to a character region, a photographic region, or a halftone dot region, and to carry out an image process in accordance with the result of discrimination.

As an image discrimination method for improving the image quality in the described manner, a method in which an image is segmented into blocks, each composed of a plurality of pixels, so as to discriminate image types per each block has been adopted widely. Here, when the image types are to be discriminated per each block by pattern matching, in order to compare the image of each block with one another, it is required to prepare a large number of patterns beforehand. As a result, the memory capacity for storing the patterns is increased, and this method is not suitable for practical applications.

Thus, in these days, it has been a common practice to adopt a method in which feature parameters are extracted from each block by a predetermined procedure and image types are discriminated in accordance with the feature parameters thus extracted.

For example, in the halftone dot-photographic region discrimination method as disclosed in Japanese Unexamined Patent publication No. 194968/1986 (Tokukaisho 61-194968), in a certain block, a change in signal level between two succeeding pixels in a main scanning direction is measured, and the sum of measured values in the block is calculated. In the same manner, the sum of the change in signal level is also calculated with respect to a sub scanning direction. The sums of measured values in the main scanning direction and in the sub scanning direction are respectively compared with a predetermined set value, and the image type of each block is discriminated in accordance with the result of this comparison.

As another method employing feature parameters, for example, Japanese Unexamined Patent publication No. 147860/1987 (Tokukaisho 62-147860) discloses a half-tone facsimile signal processing method. In this method, a difference between a maximum signal level and a minimum signal level of a certain block are determined, and the difference thus determined is compared with a predetermined first set value. When the difference is smaller than the first set value, since the block is a portion in which a change in signal level is gradual in this case, the block is judged to be a photographic region. On the other hand, when the difference is larger tan the first set value, since the block is a portion in which a change in signal level is abrupt in this case, the block is judged to include a contour of characters and pictures, or halftone dot-photographic portion.

Also, in this method, it is judged whether there is a change in signal level between two pixels succeeding specially in a block in accordance with an access order which has been set beforehand so as to calculate the number of changes. The number of changes thus calculated is compared with a second set value which has been set beforehand, and when the number of changes is larger than the second set value, the block is judged to be a halftone dot region. On the other hand, when the number of changes is smaller than the second set value, the block is judged to be a region other than the halftone dot region. The image type of each block is judged in accordance with the judgement based on the level difference and the judgement based on the number of changes.

However, in the conventional image discrimination methods as described above, the discrimination accuracy is not sufficient, and misjudgment of image type is likely to occur. Thus, in order to realize higher image quality, further improvement in the discrimination accuracy is needed.

Here, the lowering of discrimination accuracy is caused generally by unmatching of feature parameters, namely, the characteristics of the character region, the photographic region, and the halftone dot region are not sufficiently represented by feature parameters. Also, misjudgment is induced by the following important factors of (a) a method for categorizing image types based on feature parameters is inappropriate and (b) the threshold values (set values mentioned above) for categorizing image types are not selected appropriately.

Specifically, in the described prior art, a predetermined threshold value is set for each of the feature parameters. Also, each of the feature parameters and each threshold value are individually compared, and after carrying out judgement per feature parameter, the blocks including pixels are categorized in accordance with the result of each judgement. For this reason, it is difficult to set an appropriate threshold value for each feature parameter, and even when the number of feature parameters is increased, it is difficult to obtain sufficient discrimination accuracy.

Also, in the described prior art, the type of region is judged per each block. Therefore, when the region type is misjudged, the entire pixels of the block are affected, and the image quality is greatly lowered. Furthermore, because the feature parameters of the target pixel reflect only limited image processing characteristics, an optimum image process cannot be carried out in accordance with each target pixel.

As a countermeasure against these problems, Japanese Unexamined Patent publication No. 125857/1996 (Tokukaihei 8-125857) discloses an image processing apparatus in which the region type of a block is judged in accordance with a combination of plural feature parameters, and the region type of surrounding blocks are judged per each pixel. This prevents the discrimination accuracy from being lowered by inappropriate selection of the threshold values and inappropriate categorizing method.

However, even in an image processing apparatus having this arrangement, the characteristic of each region type is not fully represented by the feature parameters, and further improvement in discrimination accuracy is needed.

SUMMARY OF THE INVENTION

The present invention offers a solution to the above-mentioned problems, and accordingly it is an object of the present invention to provide an image processing apparatus capable of discriminating a character region, a photographic region, and a halftone dot region of an image with certainty, and a recording medium recording a program for image processing.

An image processing apparatus in accordance with the present invention has an arrangement including:

(1) a main direction calculating section for calculating a first line maximum value, per main line along a predetermined main direction, with respect to a binary image prepared by binarizing with a predetermined threshold value image data of a local block composed of a target pixel, which is one of pixels constituting an image, and a plurality of pixels surrounding the target pixel, the first line maximum value being a largest number of succeedingly arranged pixels having an equal value in the predetermined main direction in the local block so as to determine a difference between a main maximum value which is the largest first line maximum value and a main minimum value which is the smallest first line maximum value;

(2) a sub direction calculating section for calculating a second line maximum value, per sub line along a sub direction different from the main direction, with respect to the binary image, the second line maximum value being a largest number of succeedingly arranged pixels having an equal value in the sub direction so as to determine a difference between a sub maximum value which is the largest second line maximum value and a sub minimum value which is the smallest second line maximum value;

(3) an output section for outputting, as a variable of a succession feature parameter, larger of differences respectively outputted from the main direction calculating section and the sub direction calculating section; and (4) discriminating means for outputting region discrimination information for discriminating that the target pixel exists in which region of different image types including the character region and the halftone dot region in accordance with an output of the output section.

Incidentally, as described, it has been proposed conventionally to calculate, as a feature parameter representing the feature of the region of different image types, a difference between a maximum signal level and a minimum signal level of pixels in a certain block and the number of times the signal levels of the pixels change between binary values. However, with the feature parameter obtained in this manner, it is difficult to discriminate a coarse halftone dot region, that is a halftone dot region with a small number of lines, from a character region, especially a character region composed of fine characters. Here, "lines" refers to a series of halftone dots or characters.

Namely, generally, in the halftone dot region, compared with the character region, the difference between the maximum signal level and the minimum signal level tends to be smaller, and the number of changes in signal level tends to be larger. As these tendencies become more prominent, it becomes more difficult to distinguish the halftone dot region and the character region from each other. However, as the number of lines in the halftone dot region decreases, undesirable effects are caused that the difference between the maximum signal level and the minimum signal level is increased, and the number of changes in signal level is reduced. That is to say, when only the feature parameter as obtained in the described manner is used, the discrimination accuracy for the halftone dot region with a small number of lines and the character region is lowered.

In contrast, in the image processing apparatus in accordance with the present invention, the succession feature parameter is additionally calculated as a feature parameter representing the feature of the region of different image types. The inventors of the present invention have found that in the halftone dot region, due to the arrangement and the periodicity of the halftone dots, the main maximum value or the sub maximum value obtained in each line is smaller than that of the character region, and the main minimum value or the sub minimum value is larger than that of the character region.

Thus, when the succession feature parameter calculated in accordance with the difference of the maximum value and the minimum value is determined with respect to each of the halftone dot region and the character region, the succession feature parameter of the halftone dot region becomes clearly smaller compared with the succession feature parameter of the character region. As a result, with the succession feature parameter, it is ensured that the halftone dot region with a small number of lines and the character region, particularly, the character region composed of fine characters, are discriminated, thus greatly improving the discrimination accuracy of the image processing apparatus.

The image processing as described above having such a desirable characteristic is carried out by execution of a program recorded on a recording medium as described below.

That is, a computer-readable recording medium recording a program which calculates region discrimination information for discriminating that a target pixel, which is one of pixels constituting an image, exists in which of regions including a character region and a halftone dot region, the computer-readable recording medium recording a program for carrying out image processing which includes the steps of:

(1) calculating a first line maximum value, per main line along a predetermined main direction, with respect to a binary image prepared by binarizing with a predetermined threshold value image data of a local block composed of a target pixel and a plurality of pixels surrounding the target pixel, the first line maximum value being a largest number of succeedingly arranged pixels having an equal value in the predetermined main direction in the local block so as to determine a difference between a main maximum value which is the largest first line maximum value and a main minimum value which is the smallest first line maximum value;

(2) calculating a second line maximum value, per sub line along a sub direction different from the main direction, with respect to the binary image, the second line maximum value being a largest number of succeedingly arranged pixels having an equal value in the sub direction so as to determine a difference between a sub maximum value which is the largest second line maximum value and a sub minimum value which is the smallest second line maximum value;

(3) calculating, as a variable of the succession feature parameter, larger of differences respectively determined in the step (1) and in the step (2); and (4) generating the region discrimination information in accordance with the succession feature parameter.

Note that, as long as the local block is composed of a target pixel and pixels surrounding the target pixel, it is not necessarily required that the target pixel is located at the center of the local block. Nevertheless, in order to improve the discrimination accuracy, it is desirable that the local block is set per each target pixel so that the target pixel is located at the center of the local block.

For a fuller understanding of the nature and advantages of the invention, reference should be made to the ensuing detailed description taken in conjunction with the accompanying drawings.

BRIEF DESCRIPTION OF THE DRAWINGS

FIG. 14 is an explanatory drawing showing one example of filter coefficients used in a filtering process circuit when carrying out an enhancement process in the image processing apparatus.

FIG. 15 is an explanatory drawing showing one example of filter coefficients used in the filtering process circuit when carrying out a smoothing process in the image processing apparatus.

FIG. 16 is an explanatory drawing showing one example of filter coefficients used in the filtering process circuit when carrying out a combination of enhancement and smoothing processes in the image processing apparatus.

DESCRIPTION OF THE EMBODIMENTS

[First Embodiment]

The following will describe one embodiment of the present invention referring to FIG. 1 through FIG. 10.

Figure 1:
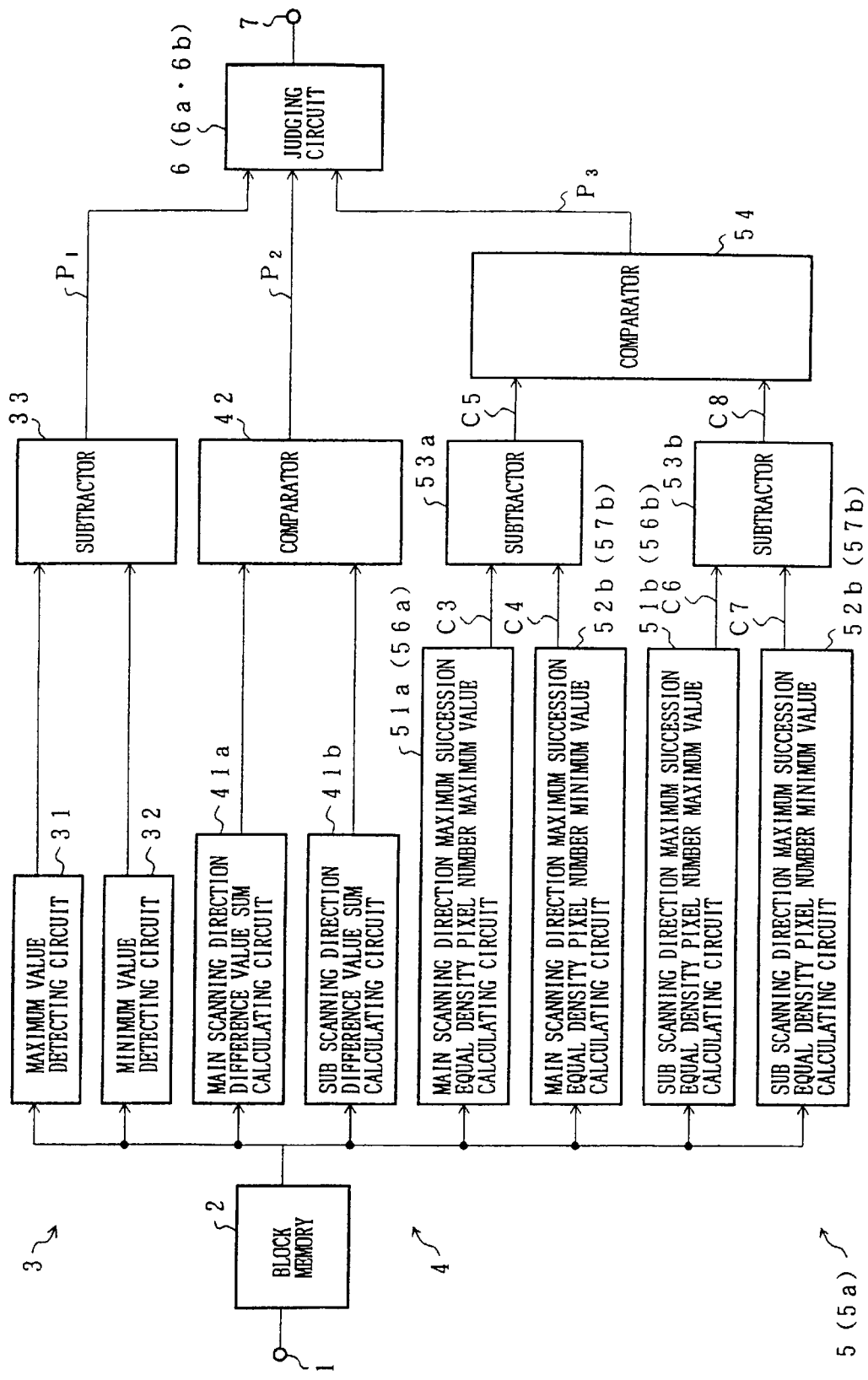
FIG. 1 is a block diagram showing main components of an image processing apparatus in accordance with one embodiment of the present invention.

Namely, an image processing apparatus in accordance with the present embodiment judges that a target pixel exists in which of a character region, photographic region, and a halftone dot region. For this purpose, the image processing apparatus includes, as shown in FIG. 1, (i) an input terminal 1 from which an image signal is inputted, (ii) a block memory 2 for storing information of each pixel in a vicinity of the target pixel in accordance with the image signal, (iii) first through third feature parameter calculating circuits 3, 4, and 5 for calculating respective variables of first through third feature parameters $P_1$ through $P_3$, respectively, in accordance with the information stored in the block memory 2, (iv) a judging circuit 6 for judging a region including the target pixel in accordance with respective output values of the feature parameter calculating circuits 3, 4, and 5, and (v) an output terminal 7 for outputting the result of judgement.

The feature parameter calculating circuits 3, 4, and 5 and the judging circuit 6 may be composed of, for example, a combination of logical circuits and calculation circuits, or may be realized by execution of a predetermined program by a CPU (Central Processing Unit).

Note that, the first feature parameter calculating circuit 3 corresponds to a maximum density difference feature parameter calculating means of the claims, and the second and third feature parameter calculating circuits 4 and 5 correspond to complexity feature parameter calculating means and succession feature parameter calculating means. Also, the judging circuit 6 corresponds to discriminating means. The third feature parameter calculating circuit 5 is referred to as succession feature parameter calculating means.

As the image signal inputted into the input terminal 1, a variety of image signals are possible. However, here, as an example, explanations will be given through the case where the image signal is obtained by reading of a document by an image reading section (not shown) having a CCD (Charge Coupled Device) image sensor in a digital copying machine or a facsimile device.

The CCD image sensor converts light intensity into an electric signal, and is capable of converting density of at least one pixel into an image signal. The image reading section, when reading a document, moves the CCD image sensor in one direction (referred to as a main scanning direction hereinafter) so as to obtain an image signal of a single line or of plural lines of a document. Note that, the number of lines which can be obtained by single scanning of the image reading section in the main scanning direction is determined by the number of pixels which the CCD image sensor is capable of reading at a time.

The CCD image sensor is then moved in a direction (sub scanning direction) orthogonal to the main scanning direction, and scans the document for one line or plural lines. By repeating this process, the image reading section obtains an image signal of the entire document. Note that, the image signal can take any form provided that the signal indicates an image whose pixels having a plurality of density levels are arranged two-dimensionally.

The block memory 2 is provided with a memory region for storing the image signal of plural lines, inputted through the input terminal 1, in 256 levels (8 bits) for each pixel. Thus, the block memory 2 stores therein an image signal of a local block composed of a target pixel and a plurality of pixels surrounding the target pixel. Note that, when the number of pixels in the sub scanning direction, which the CCD image sensor can obtain by single scanning in the main scanning direction, does not reach the number of pixels in the sub scanning direction in the local block, for example, image signals obtained by plural scanning in the main scanning direction are accumulated. This allows the image signal of the entire local block to be stored.

The first feature parameter calculating circuit 3 includes a maximum value detecting circuit 31 for calculating a maximum signal level (Amax) in the local block in accordance with the image signal stored in the block memory 2, a minimum value detecting circuit 32 for calculating a minimum signal level (Amin) in the local block in accordance with the image signal, and a subtractor 33 for subtracting the output value of the minimum value detecting circuit 32 from the output value of the maximum value detecting circuit 31. Thus, the first feature parameter calculating circuit 3 outputs, as a variable (first variable) of the first feature parameter $P_1$, a difference (B) between the maximum signal level (Amax) and the minimum signal level (Amin).

The second feature parameter calculating circuit 4 includes a main scanning direction difference value sum calculating circuit (referred to as main difference value calculating circuit hereinafter) 41a and a sub scanning direction difference value sum calculating circuit (referred to as sub difference value calculating circuit hereinafter) 41b for sequentially adding a difference value (C) between two succeeding or succeedingly arranged pixels in the main scanning direction and in the sub scanning direction, respectively, in accordance with the image signal stored in the block memory 2, and a comparator 42 for comparing respective outputs of the main difference value calculating circuit 41a and the sub difference value calculating circuit 41b.

The main difference value calculating circuit 41a, referring to the block memory 2, in the local block, sequentially adds the difference value (C) between two succeeding pixels in the main scanning direction. As a result, the sum (D) of difference values (C) in the main scanning direction in the local block is calculated. Similarly, the sub difference value calculating circuit 41b, referring to the block memory 2, calculates the sum (E) of difference values (C) in the sub scanning direction in the local block.

The comparator 42 outputs a minimum value (Fmin) of the respective outputs of the main difference value calculating circuit 41a and the sub difference value calculating circuit 41b. Note that, in the case where the number of difference values (C) are different in the main scanning direction and in the sub scanning direction, the comparator 42 normalizes the difference values (C) in accordance with the number of difference values (C) in each direction, and outputs the minimum value of the sums (D) and (E) of the normalized difference values (C). Thus, the second feature parameter calculating circuit 4 outputs, as a variable (second variable) of the second feature parameter $P_2$, the minimum value (Fmin) of the sums (D) and (E) of difference values (C) of main scanning direction and sub scanning direction in the local block.

Further, the third feature parameter calculating circuit 5 in accordance with the present embodiment includes a main direction calculating section associated with the main scanning direction and a sub direction calculating section associated with the sub direction. The main direction calculating section includes a main scanning direction maximum succession equal density pixel number maximum value calculating circuit (referred to as main maximum pixel number calculating circuit hereinafter) 51a, a main scanning direction maximum succession equal density pixel number minimum value calculating circuit (referred to as main minimum pixel number calculating circuit hereinafter) 52a, and a subtractor 53a. The sub direction calculating section includes a sub scanning direction maximum succession equal density pixel number maximum value calculating circuit (referred to as sub maximum pixel number calculating circuit hereinafter) 51b, a sub scanning direction maximum succession equal density pixel number minimum value calculating circuit (referred to as sub minimum pixel number calculating circuit hereinafter) 52b, and a subtractor 53b. The third feature parameter calculating circuit 5 further includes a comparator (output section) 54 for comparing respective outputs of the subtractors 53a and 53b so as to output larger of two values.

The main maximum pixel number calculating circuit 51a, referring to the block memory 2, binarizes each pixel in the local block with a predetermined threshold value. The main maximum pixel number calculating circuit 51a also calculates, per main line along the main scanning direction, a maximum value (maximum succession equal density pixel number) C1 of the numbers of binarized pixels having equal values in succession. Further, the main maximum pixel number calculating circuit 51a determines a maximum value C3 from the values of the maximum value C1 as calculated with respect to each main line in the local block. Note that, the number of main lines in the local block is the same as the number of pixels in the sub scanning direction. For example, when the local block has 7×7 pixels, the number of main lines is 7. Also, in the present embodiment, as an example, a maximum succession black pixel number is determined by counting the number of succeeding pixels having one of binary values, which indicates black.

Similarly, the main minimum pixel number calculating circuit 52a calculates the maximum succession equal density pixel number C1 per main line in the local block so as to determine a minimum value C4 from the values of C1. The subtractor 53a outputs a difference of the maximum value C3 and the minimum value C4 as a main scanning direction maximum succession equal density pixel number maximum value C5.

In the same manner, the sub maximum pixel number calculating circuit 51b associated with the sub scanning direction, referring to the block memory 2, binarizes each pixel in the local block with a predetermined threshold value. The sub maximum pixel number calculating circuit 51b also calculates the maximum succession equal density pixel number C1 per sub line along the sub scanning direction so as to determine a maximum value C6 from the values of C1 as calculated with respect to each sub line in the local block. The sub minimum pixel number calculating circuit 52b calculates the maximum succession equal density pixel number C1 per sub line in the local block so as to determine a minimum value C7 from the values of C1. The subtractor 53b outputs a difference of the maximum value C6 and the minimum value C7, as a sub scanning direction maximum succession equal density pixel number maximum value C8. In the following, regardless of the sub line or main line, pixels succeeding or succeedingly arranged in one direction will be referred to as a line.

Note that, the above explanation is given through the case where, as an example, each of the calculating circuits 51a, 51b, 52a and 52b itself binarizes the signal level of each pixel referring to the block memory 2. However, not limiting to this, it is possible, for example, to generate a binary image from an image signal by other means, and send the binary image to each of the calculating circuits 51a, 51b, 52a, and 52b. As long as the values of C3, C4, C6, and C7 are calculated in accordance with the binary image, the same effect as above can be obtained.

The comparator 54 compares the output value C5 of the subtractor 53a and the output value C8 of the subtractor 53b, and outputs, as a variable (third variable) of the third feature parameter $P_3$, larger (maximum value) of the two output values C5 and C8 to the judging circuit 6. The variable (first variable) of the first feature parameter $P_1$ and the variable (second variable) of the second feature parameter $P_2$ respectively outputted from the first feature parameter calculating circuit 3 and the second feature parameter calculating circuit 4 are also sent to the judging circuit 6.

Figure 2:
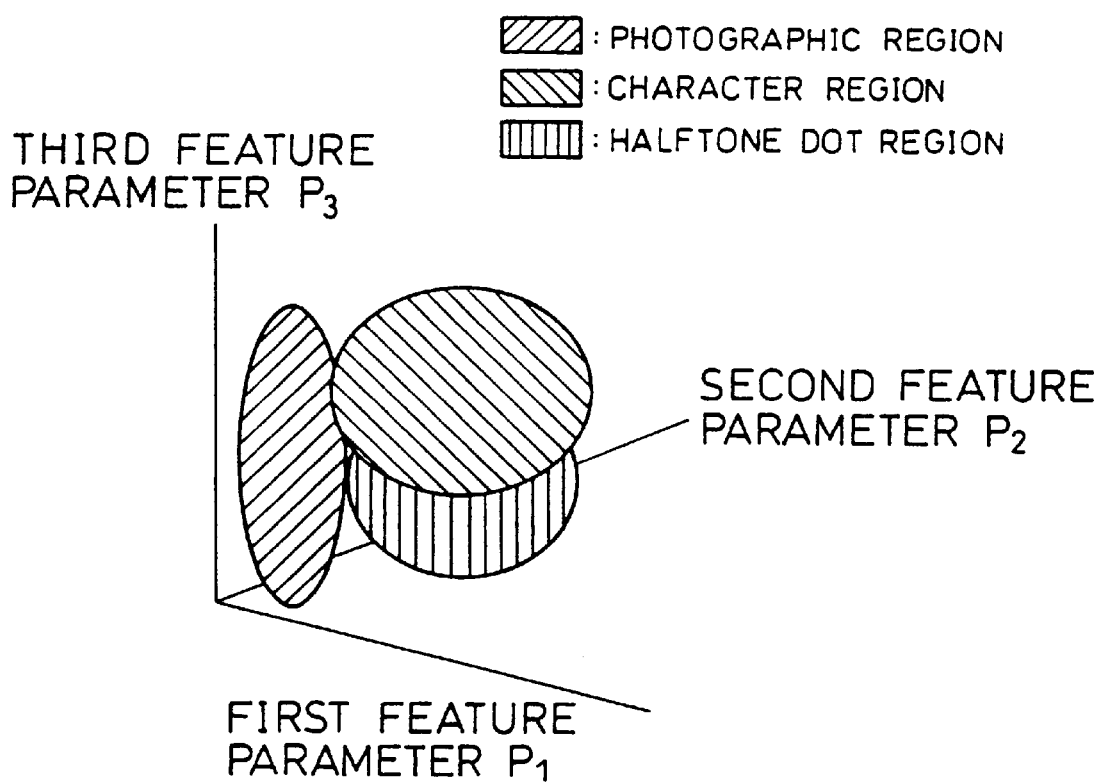
FIG. 2 is an explanatory drawing showing an example of a feature parameter distribution on axes of first through third feature parameters.

Here, after conducting research, the inventors of the present invention have found that in a three-dimensional space having the axes of the first feature parameter $P_1$, the second feature parameter $P_2$, and the third feature parameter $P_3$, the feature parameters of the pixels of the character region, the photographic region, and the halftone dot region are distributed, for example, as shown in FIG. 2.

Figure 3:
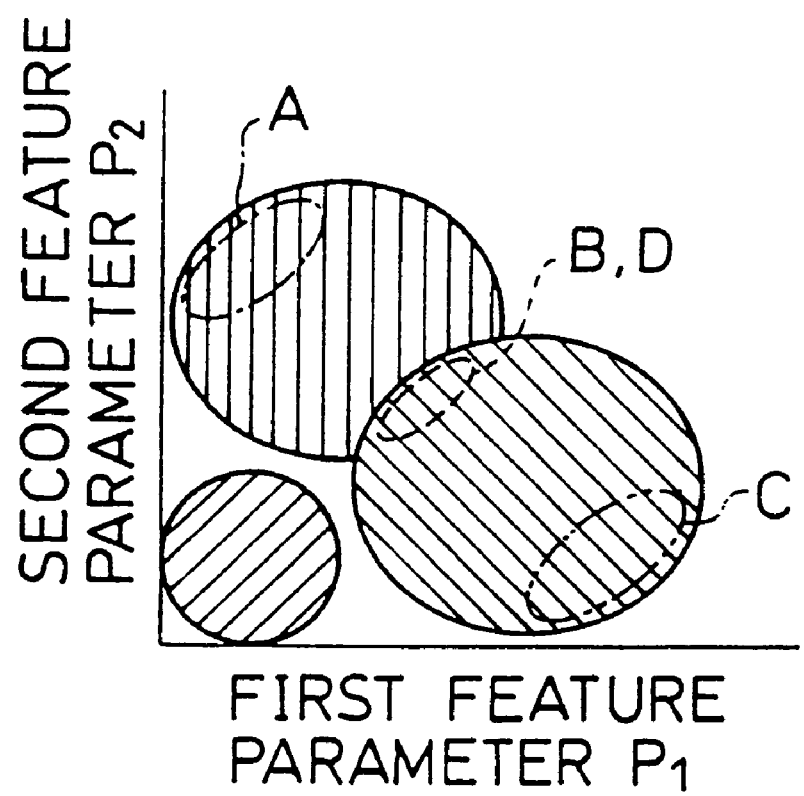
FIG. 3 is a two-dimensional projection which is a projection of the feature parameter distribution of FIG. 2 onto a plane with axes of the first and second feature parameters.
Figure 4:
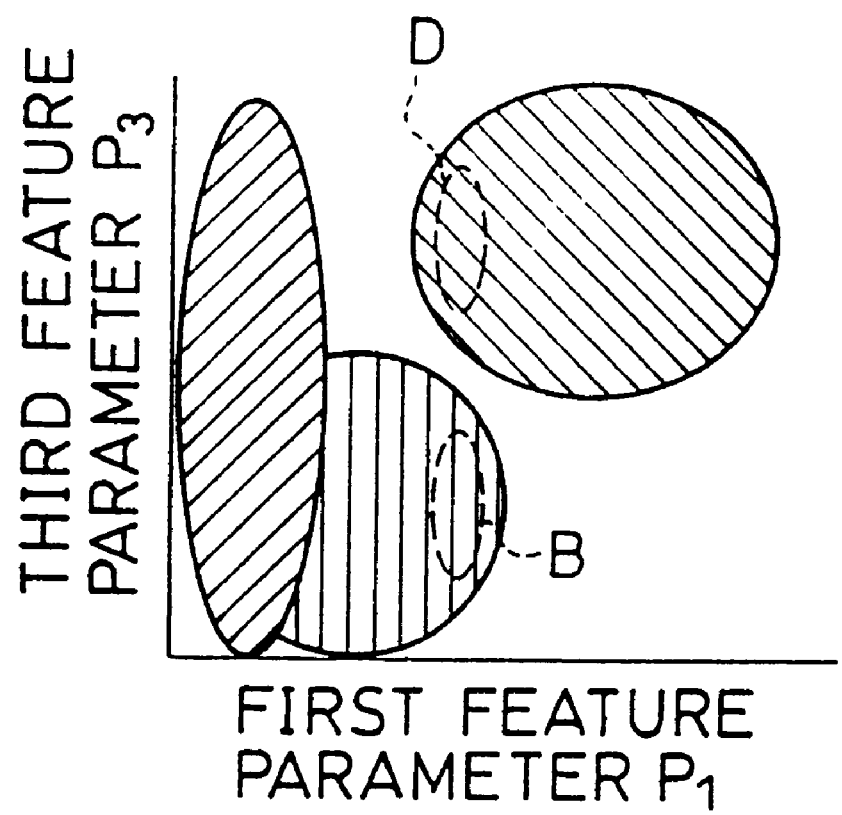
FIG. 4 is a two-dimensional projection which is a projection of the feature parameter distribution of FIG. 2 onto a plane with axes of the first and third feature parameters.
Figure 5:
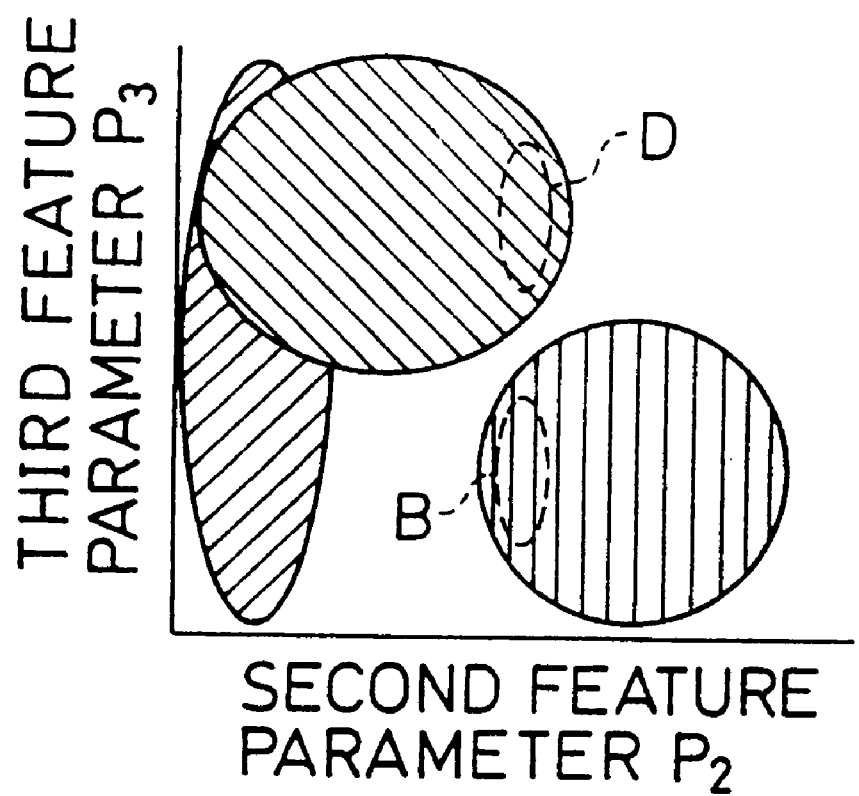
FIG. 5 is a two-dimensional projection which is a projection of the feature parameter distribution of FIG. 2 onto a plane with axes of the second and third feature parameters.

When the feature parameter distribution of FIG. 2 is projected onto a two-dimensional plane having axes of the first feature parameter $P_1$ and the second feature parameter $P_2$, the feature parameter distribution takes the form as shown in FIG. 3. Similarly, FIG. 4 is a two-dimensional projection of the feature parameter distribution of FIG. 2 onto a plane having axes of the first feature parameter $P_1$ and the third feature parameter $P_3$, and FIG. 5 is a two-dimensional projection of the feature parameter distribution of FIG. 2 onto a plane having axes of the second feature parameter $P_2$ and the third feature parameter $P_3$.

To explain in more detail, in the three-dimensional space, the first and second feature parameters $P_1$ and $P_2$ of the photographic region are smaller than those of other regions (character region and halftone dot region). However, the third feature parameter $P_3$ of the photographic region has relatively wider distribution compared with those of the other two regions. Thus, in the three-dimensional space, decision boundaries or decision surfaces for discriminating the photographic region from the other regions can be set relatively easily. Note that, in the following, decision boundaries and decision surfaces will not be distinguished specifically, and both will be referred to as boundaries.

On the other hand, it is more difficult to set a boundary for discriminating the character region and the halftone dot region from each other compared with the case with the photographic region. Namely, compared with the character region, the halftone dot region is likely to have smaller first feature parameter $P_1$ and larger second feature parameter $P_2$. However, as the number of lines in the halftone dot region decreases, the first feature parameter $P_1$ becomes larger and the second feature parameter $P_2$ becomes smaller. Thus, as shown in FIG. 3, on a plane having the axes of first and second feature parameters $P_1$ and $P_2$, the halftone dot region having a small number of lines and the character region are adjacent or overlapped with each other, and as a result it is difficult to set a boundary capable of discriminating the two regions.

For example, in FIG. 3, the feature parameter of a region composed of relatively fine 200 line halftone dots is distributed on portion A as indicated by the alternate long and short line, and the feature parameter of a region composed of relatively coarse 85 halftone dots is distributed on portion B as indicated by the broken line. On the other hand, the feature parameter of a region composed of relatively large 20 class characters is distributed on portion C as indicated by the alternate long and two short lines, and the feature parameter of a region composed of relatively small 7 class characters is distributed on portion D which overlaps the feature parameter of the region composed of 85 line halftone dots. Thus, when the regions are to be discriminated based solely on the first and second feature parameters $P_1$, and $P_2$, the coarse halftone dots (85 line halftone dots) and the small characters (7 class characters) cannot be discriminated against each other.

Here, in the halftone dot region, compared with the character region, the arrangement of pixels is constant, and periodicity is likely to appear in the density of pixels. As a result, as shown in FIG. 2, in the distribution of the halftone dot region, regardless of the number of lines in the halftone dot region, the third feature parameter $P_3$ is likely to be small. Thus, as shown in FIG. 3, even when it is difficult to set a boundary capable of discriminating the two regions on a plane having the axes of first and second feature parameters $P_1$ and $P_2$, as shown in FIG. 4 and FIG. 5, by providing the third feature parameter $P_3$, it is ensured that the boundary is set. As a result, it is possible to discriminate coarse halftone dots such as 85 line halftone dots and small characters such as 7 class characters from each other, thus improving the discrimination accuracy of the image processing apparatus.

Upon receiving respective variables of the feature parameters $P_1$, $P_2$, and $P_3$ of the target pixel from the feature parameter calculating circuits 3, 4, and 5, the judging circuit 6 of the present embodiment carries out the categorizing process in the three-dimensional space, and outputs region discrimination information in accordance with the feature of the region (local block) including the target pixel.

The region discrimination information may be a signal, such as a discrimination signal Oa (mentioned later), which clearly distinguishes that the region including the target pixel is the character region, the photographic region, or the halftone dot region, or may be represented by a value, such as an output value Ob (mentioned later), which indicates the likelihood that the region including the target pixel is the character region, the photographic region, or the halftone dot region.

Figure 6:
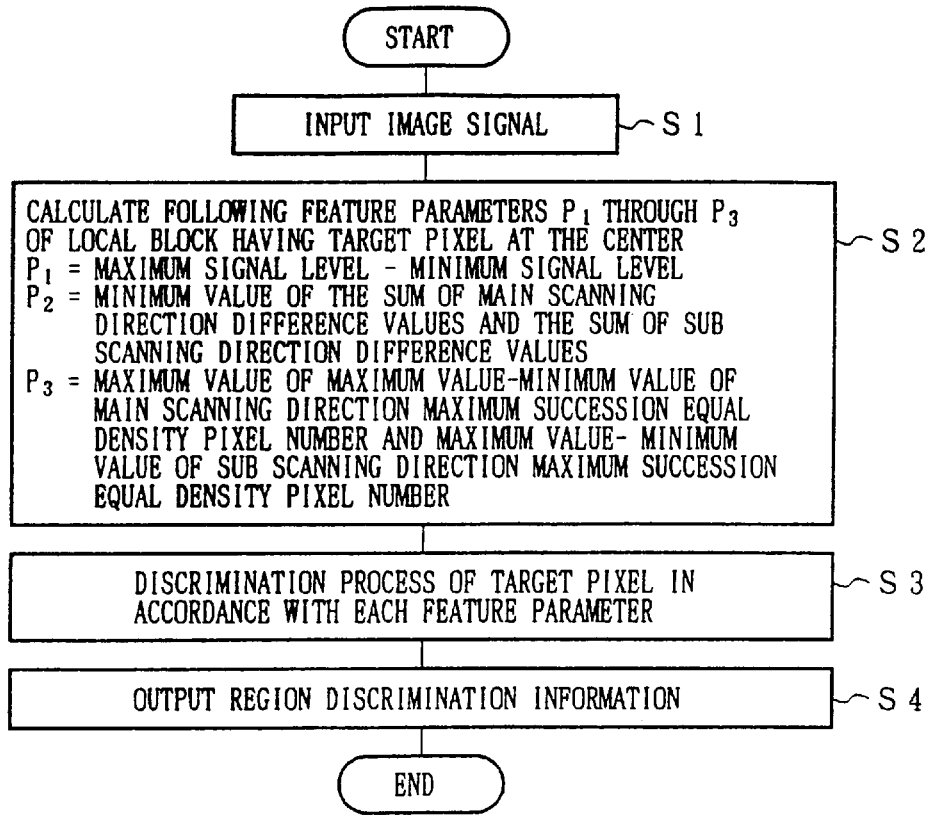
FIG. 6 is a flowchart showing an operation of the image processing apparatus.

In accordance with the described arrangement, the following describes the flow of the region discriminating process of a recorded image referring to the flowchart of FIG. 6. Namely, in Step 1 (Hereinafter, Step will be abbreviated to S), when an image obtained by scanning of a document by the image reading section including the CCD image sensor is inputted to the input terminal 1 of the image processing apparatus of FIG. 1, the block memory 2 stores the image signal of a local block having a target pixel at the center. Then in S2, the first through third feature parameter calculating circuits 3, 4, and 5 calculate respective variables of the first through third feature parameters $P_1$, $P_2$, and $P_3$ of the local block, respectively, referring to the block memory 2.

The judging circuit 6, in S3, categorizes the feature of the local block in accordance with the variables calculated in S2, and in S4, outputs region discrimination information. As a result, the region (local block) including the target pixel is discriminated to be the character region, the photographic region, or the halftone dot region, namely, it is discriminated that the target pixel exists in which of the character region, the photographic region, and the halftone dot region. The process of S2 through S4 is carried out consecutively with respect to all the pixels included in the image signal inputted into the image processing apparatus.

Here, as in the conventional arrangement, in the case where a block is set beforehand, and regions are discriminated per block, the feature parameters of pixels of a certain block are reflected only when categorizing the feature parameters of this block. Thus, when a boundary is drawn between adjacent pixels in the block, the feature parameter of one of the pixels is not used when discriminating the block including the other pixel.

However, in the image processing apparatus in accordance with the present embodiment, since the process of S2 to S4 is carried out per each pixel, a new local block having a target pixel at the center is set everytime a pixel is set to be the target pixel. Thus, compared with the case where a block is set beforehand, the discrimination accuracy is improved, and optimum region discrimination information in accordance with each target pixel is generated. As a result, with this region discrimination information, it is possible to carry out delicate processes such as optimum image processing in accordance with each target pixel.

Figure 7:
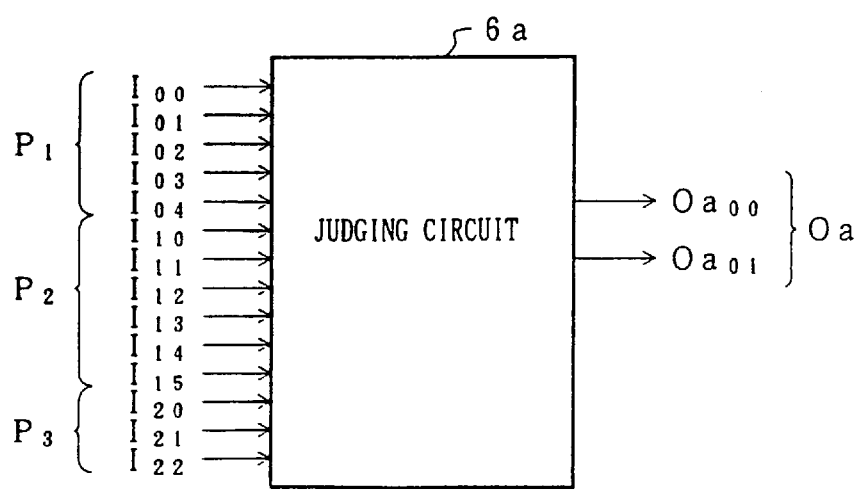
FIG. 7 is an explanatory drawing showing one example of a judging circuit of the image processing apparatus.
Figure 8:
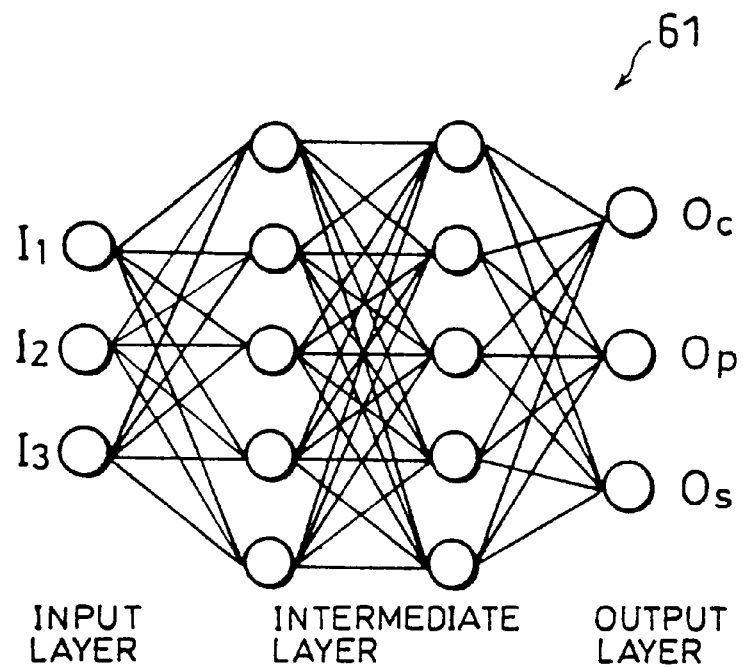
FIG. 8 is an explanatory drawing showing a neural network used in the judging circuit.
Figure 9:
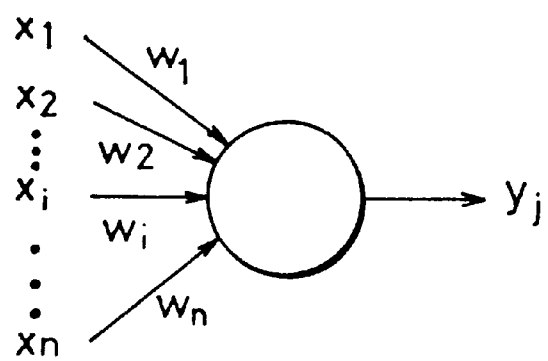
FIG. 9 an explanatory drawing showing an input-output relationship of neural elements of the image processing apparatus.

The following describes a specific example of the structure of the judging circuit 6 referring to FIG. 7 through FIG. 9. In this example, the judging circuit 6 selects whether the region including the target pixel is the character region, the photographic region, or the halftone dot region, namely, a discrimination signal Oa in accordance with each region type is outputted as region discrimination information.

Here, for example, it is assumed that the local block has a size composed of 7×7 pixels, and the signal level of each pixel is expressed in 256 levels (8 bits).

Here, the first feature parameter $P_1$ is the difference (B) between the maximum signal level (Amax) and the minimum signal level (Amin), and takes a value from 0 to 255. Thus, the first feature parameter $P_1$, can be expressed in 8 bits. In the actual case, the first feature parameter $P_1$, is saturated with 7 bits of LSB (Least Significant Bits) of 8 bits, and the lower 7 bits of 8 bits are significant. Also, the lower 2 bits of the lower 7 bits of the first feature parameter $P_1$ are removed, and the remaining 5 bits are inputted as input signals $I_{00}$ to $I_{04}$ to a judging circuit 6a of FIG. 7.

The second feature parameter $P_2$ is the sum (D) of the differences (difference value (C)) in signal level between pixels. Thus, the minimum value of the second feature parameter $P_2$ is 0, and the maximum value is 10710 (255× 6×7=10710). Thus, the second feature parameter $P_2$ is expressed in 14 bits. As in the case of the first feature parameter $P_1$, the second feature parameter $P_2$ is saturated with the lower 10 bits of the 14 bits, and the lower 4 bits are removed, and input signals $I_{10}$ to $I_{15}$ of 6 bits are inputted into the judging circuit 6a.

The third feature parameter $P_3$ is the difference between the maximum values (C3 and C6) and the minimum values (C4 and C7) of the maximum succession equal density pixel number. Thus, the third feature parameter $P_3$ takes a value between 0 and 7, and is expressed as data of 4 bits. The third feature parameter $P_3$ is saturated with the lower 3 bits of the 4 bits, and input signals $I_{20}$ to $I_{22}$ of 3 bits are inputted into the judging circuit 6a.

The judging circuit 6a of FIG. 7 outputs a discrimination signal Oa of 2 bits so that the character region, the photographic region, and the halftone dot regions are discriminated from one another. For example, when the result of judgement is a character region, the judging circuit 6a outputs a discrimination value "0" indicative of a character region, as the discrimination signal Oa where $Oa_{00}=0$ and $Oa_{01}=0$. In the same manner, in the case of the photographic region, a discrimination value "1" ($Oa_{00}=0$ and $Oa_{01}=1$) is outputted, and in the case of the halftone dot region, a discrimination value "2" ($Oa_{00}=1$ and $Oa_{00}=0$) is outputted.

The judging circuit 6a is realized by (a) a look-up table whose input-output characteristics are determined beforehand by a neural network or (b) a neural network itself. As an example of the neural network used here, as shown in FIG. 8, a four-layer perceptron is available. In an input layer of a neural network 61, $I_1$ receives a value obtained by normalizing the first feature parameter $P_1$. In the same manner, $I_2$ and $I_3$ respectively receive values obtained by normalizing the second feature parameter $P_2$ and the third feature parameter $P_3$, respectively. In an output layer of the neural network 61, $O_c$ outputs a value indicative of the likelihood of the character region, $O_p$ outputs a value indicative of the likelihood of the photographic region, and $O_s$ outputs a value indicative of the likelihood of the halftone dot region. Each input of the input layer is connected to all neural element inputs of an intermediate layer, and each output of the intermediate layer is connected to all neural element inputs of the output layer.

As shown in FIG. 9, each neural element has multiple inputs and a single output. When the input value to each neural element is $x_i$, each weight coefficient is $w_{ij}$, and the output value is $y_j$, each neural element calculates the sum of products in accordance with Equation (1), and the result $x_j$ of Equation (1) is substituted as an input to the sigmoid function of Equation (2) so as to output $y_j$.

$$X_j = \sum_{i=i}^{n} w_{ij} \times x_i \qquad (1)$$

$$y_j = f(X_j) = \frac{1}{1 + \exp(-X_j)} \qquad (2)$$

In a well-learned neural network 61, upon receiving the feature parameters $P_1$ through $P_3$ obtained in the character region, $O_c$, $O_p$, and $O_s$ of the output layer respectively output values close to "1", "0", and "0". Similarly, upon receiving the feature parameters $P_1$ through $P_3$ obtained in the photographic region, $O_c$, $O_p$, and $O_s$ of the output layer respectively output values close to "0", "1", and "0". Likewise, upon receiving the feature parameters $P_1$ through $P_3$ obtained in the halftone dot region, $O_c$, $O_p$ and $O_s$ of the output layer respectively output values close to "0", "0", and "1".

In the judging circuit 6a of FIG. 7, discrimination values, namely, values of $Oa_{00}$ and $Oa_{01}$, are determined in accordance with the values respectively obtained from $O_c$, $O_p$.

and $O_s$ of the output layer of the neural network 61. For example, when $O_c$ takes the maximum value, $Oa_{00}=0$ and $Oa_{01}=0$, and when $O_p$ takes the maximum value, $Oa_{00}=0$ and $Oa_{01}=1$, and when $O_s$ takes the maximum value, $Oa_{00}=1$ and $Oa_{01}=0$.

In the case of realizing the judging circuit 6a by a look-up table, the input-output characteristics of the neural network 61 are reflected in the look-up table. Specifically, a look-up table (not shown) is realized by a memory device such as RAM (Random Access Memory) or ROM (Read Only Memory). The memory device is provided with memory regions corresponding to combinations of the feature parameters $P_1$ through $P_3$, and a discrimination value is stored in each memory region.

The look-up table, upon receiving the feature parameters $P_1$ through $P_3$, outputs the discrimination value stored referring to a memory region corresponding to the combination of the feature parameters $P_1$ through $P_3$ inputted. The discrimination values stored in the look-up table reflect the input-output characteristics of the neural network 61. For example, when the neural network 61 outputs a certain discrimination value in response to an input of a certain combination of the feature parameters $P_1$ through $P_3$, the discrimination value is stored in a memory region corresponding to this combination of the feature parameters $P_1$ through $P_3$.

On the other hand, in the case of realizing the judging circuit 6a by the neural network 61 itself, the judging circuit 6a is composed of, along with other members, the neural network 61 of FIG. 8 and an encoder (not shown) for encoding the discrimination values from the values obtained from $O_c$, $O_p$, and $O_s$ of the output layer of the neural network 61.

Figure 10:
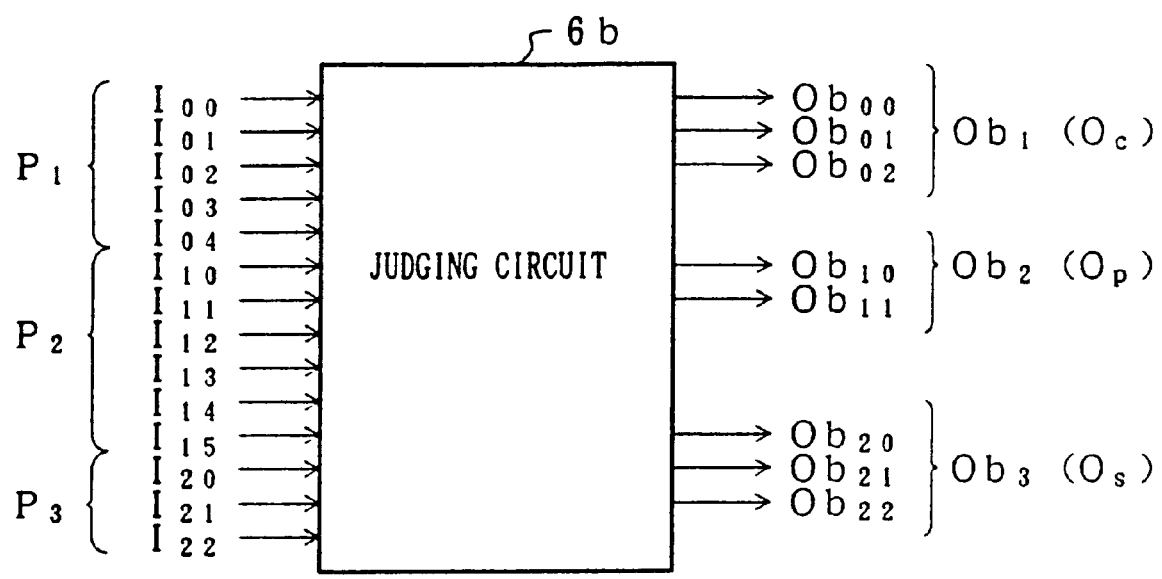
FIG. 10 is an explanatory drawing showing another example of the judging circuit of the image processing apparatus.

The following describes, as another example of the structure of the judging circuit 6 of FIG. 1, the case where discrimination information indicative of the likelihood that the region including the target pixel is a character region, a photographic region, or a halftone dot region is outputted, referring to FIG. 10.

Namely, as in the case of the judging circuit 6a of FIG. 7, a judging circuit 6b in accordance with the present example receives input signals $I_{00}$ to $I_{04}$ indicative of the first feature parameter $P_1$, input signals $I_{10}$ to $I_{15}$ indicative of the second feature parameter $P_2$, and input signals $I_{20}$ to $I_{22}$ indicative of the third feature parameter $P_3$. However, the output of the judging circuit 6b is different from that of the judging circuit 6a. Of the 8 bits of the output value Ob, 3 bits ($Ob_{00}$ to $Ob_{02}$) are used as an output value indicative of the likelihood of the character region, and 2 bits ($Ob_{10}$ and $Ob_{11}$) are used as an output value indicative of the likelihood of the photographic region, and 3 bits ($Ob_{20}$ to $Ob_{22}$) are used as an output value indicative of the likelihood of the halftone dot region.

Note that, the total number of bits of the output value Ob and the number of bits allocated to each region type are not limited to the above example, and other values may be adopted. However, as shown in FIG. 2 through FIG. 5, it is easier to judge the photographic region compared with the character region and the halftone dot region. Thus, in the case where it is required to cut down the total number of bits of the output value Ob, it is desirable that a less number of bits are allocated to the photographic region compared with that to the other regions.

As in the case of the judging circuit 6a, the judging circuit 6b can be realized by the neural network 61 of FIG. 8 itself, or by a look-up table reflecting the input-output characteristics of the neural network 61. However, the judging circuit 6b differs from the judging circuit 6a in that the $O_c$, $O_p$, and $O_s$ of the output layer correspond to the output value Ob differently.

Specifically, in the judging circuit 6b, the value obtained from $O_c$ of the output layer is converted into 3 bits so as to determine values of $Ob_{00}$ to $Ob_{02}$. In the following, the values of $Ob_{00}$ to $Ob_{02}$ will be referred to as $Ob_1$. In the same manner, the value obtained from $O_p$ of the output layer is converted to 2 bits so as to obtain a value $Ob_2$ of $Ob_{10}$ to $Ob_{11}$, and the value obtained from $O_s$ of the output layer is converted to 3 bits so as to determine a value of $Ob_3$ of $Ob_{20}$ to $Ob_{22}$.

Note that, the number of input bits for the judging circuit 6a and the judging circuit 6b is not limited to the numbers mentioned above, so that it is possible to select an arbitrary number of bits depending on the use. However, when the number of input bits is increased, while the judging accuracy is improved, lowering of processing speed and a rise in cost are induced. Therefore, it is desirable to select an optimum number of bits considering these conditions. Also, the structure of the neural network is not limited to the one shown in FIG. 8. Namely, in the neural network, the number of intermediate layers and the number of neural elements of the intermediate layer are arbitrary, and it is possible to adopt a neural network having a different structure.

Incidentally, in the above example, when the third feature parameter calculating circuit 5 of FIG. 1 calculates the variable of the third feature parameter $P_3$, the maximum succession equal density pixel number C1 is determined per line in a local block, and differences (C5 and C8) between maximum values (C3 and C6) and minimum values (C4 and C7) of the maximum succession equal density pixel number C1 are calculated.

However, since the number of the maximum succession equal density pixel number C1 is not more than the number of pixels in a line direction, the differences (C5 and C8) between the maximum values and the minimum values cannot exceed the number of pixels in a line direction. Here, since the third feature parameter $P_3$ is calculated as the maximum value of the difference C5 in the main scanning direction and the difference C8 in the sub scanning direction, the value of the third feature parameter $P_3$ also cannot exceed the number of pixels in a line direction.

In this manner, in the above calculation method, the size of the third feature parameter $P_3$ is limited to not more than the number of pixels in each line direction of a local block. As a result, the difference between the feature parameter of the character region and the feature parameter of the halftone dot region becomes small with respect to the third feature parameter $P_3$, and this might set a limit to the improvement of discrimination accuracy.

In contrast, in a third feature parameter calculating circuit 5a which will be described in the following, the third feature parameter $P_3$ is calculated based on a sum C2 of the maximum succession equal density pixel number C1 of succeeding plural lines instead of the maximum succession equal density pixel number C1.

Specifically, as shown in FIG. 1, a main maximum pixel number calculating circuit 56a, which is provided instead of the main maximum pixel number calculating circuit 51a, calculates the maximum succession equal density pixel number C1 per main line, and calculates the sum C2 of plural main lines succeeding or succeedingly arranged in the sub scanning direction. Then, the main maximum pixel number calculating circuit 56a outputs the maximum value of C2 of the local block as C3.

For example, when a local block has 7 main lines and the number of succeeding plural lines is 2, six C2 are calculated in the local block, and the maximum value of the six C2 is outputted as C3. In the same manner, a main minimum pixel number calculating circuit 57a, which is provided instead of the main minimum pixel number calculating circuit 52a, outputs a minimum value C4 of the six C2 in a local block.

The same process is also carried out with respect to the sub scanning direction. A sub maximum pixel number calculating circuit 56b and a sub minimum pixel number calculating circuit 57b, which are provided instead of the sub maximum pixel number calculating circuit 51b and a sub minimum pixel number calculating circuit 52b, respectively, calculate the maximum succession equal density pixel number C1 per sub line, and determine the sum C2 of plural sub lines succeeding in the main scanning direction. The sub maximum pixel number calculating circuit 56b and the sub minimum pixel number calculating circuit 57b then respectively output a maximum value C6 and a minimum value C7 of respective sums C2.

Depending on the pixel resolution, there is a case where the thickness of a line of a character or a halftone dot exceeds two pixels. In such a case, between succeeding plural lines, the signal levels of pixels often result in the same level. Note that, in the case where an image signal is generated, for example, by scanning of a document by the image reading section including the CCD image sensor, the pixel resolution is determined by the reading resolution.

In the described manner, by calculating the variable of the third feature parameter $P_3$ using the sums C2 of succeeding plural lines instead of the value of C1 of a single line, it is possible to increase the value of third feature parameter $P_3$ while sufficiently representing the feature of the local block. In other words, the resolution of the third feature parameter $P_3$ is improved. As a result, the difference between the feature parameter of the character region and the feature parameter of the halftone dot region is further increased with respect to the third feature parameter $P_3$, and the discrimination accuracy of the judging circuit 6 is improved.

[Second Embodiment]

In the image processing apparatus as described above, the explanations are given through the case where the second feature parameter calculating circuit 4 is provided with the main difference value calculating circuit 41a and the sub difference value calculating circuit 41b, and the sum of difference values is calculated with respect to each of the main scanning direction and the sub scanning direction.

Figure 11:
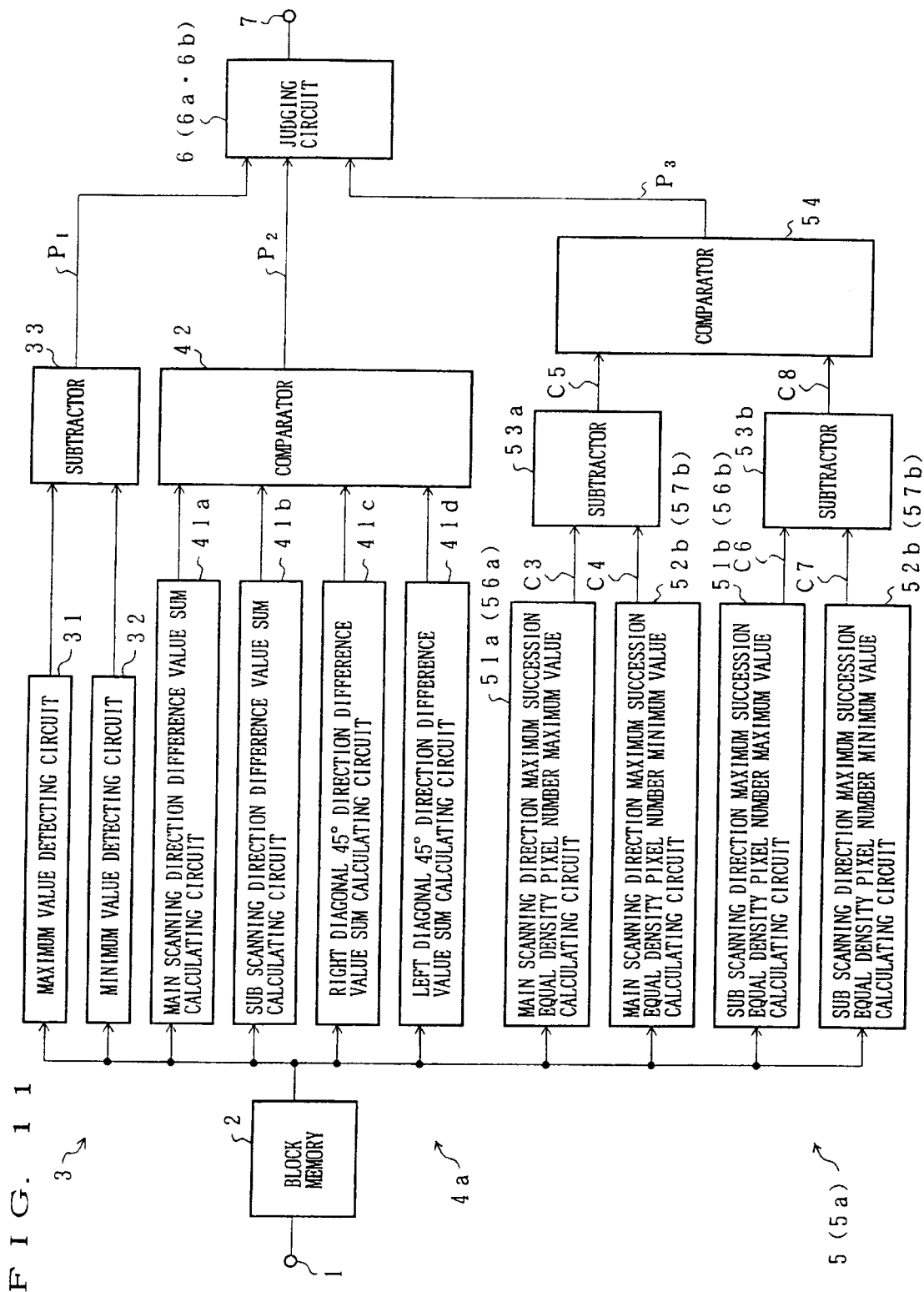
FIG. 11 is a block diagram showing main components of an image processing apparatus in accordance with another embodiment of the present invention.

In contrast, in the present embodiment, two additional directions are provided for calculating the sum of difference values. Specifically, as shown in FIG. 11, in a second feature parameter calculating circuit 4a in accordance with the present embodiment, in addition to the structure of the second feature parameter calculating circuit 4, there are provided a right diagonal 45° direction difference value sum circuit 8, a filtering process circuit 8b which switches the filter coefficients in the manner described below is used. Namely, when the judging circuit 6b judges that the region including the target pixel is the character region, while the output value $Ob_1$ indicative of the likelihood of the character region becomes large, the output value $Ob_2$ indicative of the likelihood of the photographic region and the output value $Ob_3$ indicative of the likelihood of the halftone dot region become small. The filtering process circuit 8b judges, when the output value $Ob_1$ is larger than a pre-set value and the output values $Ob_2$ and $Ob_3$ are smaller than the pre-set value, that the region including the target pixel is the character region, and subjects the image signal to an enhancement process with an enhancement filter having the filter coefficients of FIG. 14. As a result, the edges of the image are enhanced, and the characters and line drawings appear sharper.

Also, when the judging circuit 6b discriminates the halftone dot region, namely, when the output value $Ob_3$ indicative of the likelihood of the halftone dot region is larger than the pre-set value and the output values $Ob_1$ and $Ob_2$ are smaller than the pre-set value, the image signal is subjected to a smoothing process with a smoothing filter having the filter coefficients of FIG. 15. As a result, it is possible to prevent moire from generating in the halftone dot region of the image.

When the photographic region is discriminated, namely, when the output value $Ob_3$ indicative of the likelihood of the photographic region is larger than the pre-set value and the output values $Ob_1$ and $Ob_2$ are smaller than the pre-set value, the filtering process circuit 8b outputs the image signal without carrying out the filtering process.

In addition, in the judging circuit 6b, when it is difficult to judge whether a region including the target pixel is the character region, the photographic region, or the halftone dot region, namely, when misjudgment is likely, there will be no large difference among the output values $Ob_1$ through $Ob_3$ indicative of the likelihoods of the character region, the photographic region, and the halftone dot region, respectively. In such a case, the filtering process circuit 8b outputs the image signal without carrying out the filtering process. Alternatively, in such a case, the filtering process circuit 8b subjects the image signal to a filtering process using, for example, a filter having the filter coefficients of FIG. 16, namely, with a filter having a combined function of enhancement and smoothing. In this manner, the filtering process circuit 8b discriminates the case where misjudgment is likely, and selects filter coefficients which reduce the adverse effect of misjudgment even when misjudgment occurs. As a result, it is possible to prevent the image from being adversely affected by misjudgment, and the image is improved. Note that, the filter coefficients of FIG. 14 through FIG. 16 are just one example, and it is possible to adopt a filter having an arbitrary mask size and arbitrary filter coefficients.

Incidentally, the above descriptions are based on the case where the filter processing circuit 8 selects one of the filter coefficients which have been prepared beforehand, in accordance with the region discrimination information outputted from the judging circuit 6.

However, as in the case of the judging circuit 6b of FIG. 10, in the case where the judging circuit 6 outputs the value Ob indicative of the likelihood of each region type, namely, when the region discrimination information indicates the likelihood of the character region, the photographic region, and the halftone dot region, respectively, a filtering process circuit 8c as described below is adopted as the filtering process circuit 8. This allows the filtering process to be carried out by determining optimum filter coefficients for the target pixel.

Specifically, in the filtering process circuit 8c, the weight coefficient $W_e$ of the enhancement filter and the weight coefficient $W_s$ of the smoothing filter are determined from the following Equations of (3) and (4), respectively.

$$W_e = g_1(O_c) \qquad (3)$$

$$W_s = g_2(O_s) \qquad (4)$$

Note that, in Equations (3) and (4), $O_c$ represents a numerical value indicative of the likelihood of the character region, and $O_s$ represents a numerical value indicative of the likelihood of the halftone dot region, and the output values $O_c$ and $O_s$ are normalized to have a value in a range of 0 to 1.

Here, as an example, $W_e$ and $W_s$ are determined using the following Equation (5).

$$g_1(x) = g_2(x) = \begin{cases} -10x + 11 & (x \geq 0.2) \\ 0 & (x < 0.2) \end{cases} \quad (5)$$

By a spacial filter $f_1$ with the inputs of $W_e$ and $W_s$, a spacial filtering process is carried out with respect to an input image signal I as shown in the following Equation (6), and a processed value O is outputted.

$$O = f_1(W_e, W_s, I) \quad (6)$$

Here, as an example of the spacial filter $f_1$, the filter as indicated by Equation (7) is shown.

$$O = \begin{cases} \left(\left(\frac{1}{W_e}\begin{bmatrix} 0 & -1 & 0 \\ -1 & W_e+4 & -1 \\ 0 & -1 & 0 \end{bmatrix}\right) \cdot \left(\left(\frac{1}{W_e+8}\begin{bmatrix} 1 & 1 & 1 \\ 1 & W_s & 1 \\ 1 & 1 & 1 \end{bmatrix}\right) \cdot I\right)\right) & (W_e \geq 2, W_s \geq 2) \\ \left(\frac{1}{W_e+8}\begin{bmatrix} 1 & 1 & 1 \\ 1 & W_s & 1 \\ 1 & 1 & 1 \end{bmatrix}\right) \cdot I & (W_e < 2, W_s \geq 2) \\ \left(\frac{1}{W_e}\begin{bmatrix} 0 & -1 & 0 \\ -1 & W_e+4 & -1 \\ 0 & -1 & 0 \end{bmatrix}\right) \cdot I & (W_e \geq 2, W_s < 2) \\ I & (W_e < 2, W_s < 2) \end{cases} \quad (7)$$

Note that, "[ ]·I" in Equation (7) indicates the convolution calculation of the operator "[ ]" and the image signal I.

In the described arrangement, the filtering process circuit 8c adjusts the filter coefficients based on the region discrimination information indicative of the likelihood of each region type. As a result, the image signal is subjected to a filtering process with optimum filter coefficients for each target pixel, thus realizing an image processing apparatus capable of improving the image quality with more certainty.

Further, in the filtering process circuit 8c, in the case where the likelihood of each region type is substantially the same, namely, when it is difficult to categorize the region including the target pixel to be any of the character region, the photographic region, and the halftone dot region, for example, the filter coefficients are adjusted to have a combined function of enhancement and smoothing. This prevents the image quality from being deteriorated by judgement error. As a result, the quality of the image is further improved.

Note that, the functions $g_1$ and $g_2$ in Equation (5) may be replaced with other functions, and it is possible to adopt an arbitrary mask size and arbitrary filter coefficients for the filter $f_1$. When the filtering process circuit 8 changes the filter coefficients based on the region discrimination information indicative of the likelihood of each region type, the same effect as in the present embodiment can be obtained.

Also, the image processing apparatuses in accordance with First through Third Embodiment have an arrangement wherein the first through third feature parameter calculating circuits 3, 4, and 5 (5a) are provided, and the judging circuit 6 (6a) outputs a region discrimination signal for discriminating the character region, the photographic region, and the halftone dot region in accordance with the combination of feature parameters of the first through third feature parameters $P_1$ through $P_3$ However, the arrangement is not limited to this. When the region discrimination signal is generated by the judging circuit 6 (6a) in accordance at least with the variable of the third feature parameter $P_3$, the same effect can be obtained.

For example, it is possible to have an arrangement wherein only the third feature parameter calculating circuit 5 (5a) of the feature parameter calculating circuits 3, 4 (4a), 5 (5a) is provided, and the judging circuit 6 outputs the region discrimination signal in accordance with the variable of the third feature parameter $P_3$. As mentioned above referring to FIG. 2, the distribution of the halftone dot region tends to be small with respect to the third feature parameter $P_3$ irrespective of the number of lines in the halftone dot region. Thus, by discriminating based only on the third feature parameter $P_3$, as shown in FIG. 3 through FIG. 5, it is ensured that a region composed of coarse halftone dots and a region composed of small characters are distinguished.

However, in the case of discriminating in accordance only with the variable of the third feature parameter $P_3$, there is a case where a region composed of large characters is erroneously discriminated as the halftone dot region, or a region composed of fine halftone dots is erroneously discriminated as the character region. Thus, as in First through Third Embodiment, it is preferable to have an arrangement wherein either the first feature parameter calculating circuit 3 or the second feature parameter calculating circuit 4 (4a) is provided, and the judging circuit 6 (6a) generates the region discrimination signal in accordance with the variable of the first feature parameter $P_1$ or the variables of the second feature parameter $P_2$ and the third feature parameter $P_3$. This allows the discrimination accuracy of the image processing apparatus to be further improved.

To describe in more detail, the third feature parameter $P_3$ is calculated in accordance with the image of a binarized local block. Thus, when the contrast is low as in a region composed of fine halftone dots, there is a case where the same value is given to adjacent pixels due to binarization. Further, when a density slope exists in an image, in one portion of the local block, for example, in the upper half portion, all the pixels therein take one of the binary values, and in the other portion of the local block, all the pixels therein take the other binary value. In such a case, despite that fact that the region is a halftone dot region, the third feature parameter $P_3$ is increased, and it becomes difficult to distinguish this region from the character region.

In contrast, the first feature parameter $P_1$ decreases in a region having low contrast as in a region composed of fine halftone dots. Thus, as shown in FIG. 4, when the judging circuit 6 (6a) generates the region discrimination signal in accordance with a combination of the first and third feature parameters $P_1$ and $P_3$, the character region and the halftone dot region can be discriminated more accurately irrespective of the size of the halftone dot.

Similarly, the second feature parameter $P_2$ increases in a region in which a density change is frequent as in a region composed of fine halftone dots. Thus, as shown in FIG. 5, when the judging circuit 6 (6a) generates the region discrimination signal in accordance with a combination of the second and third feature parameters $P_2$ and $P_3$, the character region and the halftone dot region can be discriminated more accurately irrespective of the size of the halftone dot.

Also, since the third feature parameter $P_3$ is calculated in accordance with the succession in the main scanning direction and the succession in the sub scanning direction, the possibility of erroneously discriminating characters having diagonal lines as the halftone dot region is relatively high. The occurrence of this error is increased as the size of characters is increased. Therefore, as in Second Embodiment, by proving the second feature parameter calculating circuit 4a with the diagonal direction difference value calculating circuit 41c (41d), it is further ensured that the region composed of large characters is not discriminated erroneously.

In addition, as mentioned above referring to FIG. 2 through FIG. 5, compared with the character region and the halftone dot region, in the photographic region, the variable of the first feature parameter $P_1$ and the variable of the second feature parameter $P_2$ tend to be small. Thus, when the judging circuit 6 (6a) generates the region discrimination signal in accordance with all combinations of the first through third feature parameters $P_1$ through $P_3$, it is possible to discriminate the character region, the photographic region, and the halftone dot region.

Note that, in First through Third Embodiment, the explanations are based on the case where the image signal is obtained by scanning of a document. However, not limiting to this, for example, the image signal may be obtained at once as in the case of using a digital camera, or may be sent from a memory device or a communication device. The present invention is applicable as long as an image signal indicative of the image in which pixels having a plurality of density levels are arranged two-dimensionally is inputted to the image processing apparatus.

However, in the present invention, because the variable of each of the first through third feature parameters $P_1$, through $P_3$ is calculated in accordance with the maximum density difference, complexity, and succession of a local block composed of neighboring pixels, the discrimination accuracy can be improved without referring to the image signals of distant pixels. Thus, even in the case where the image signals of neighboring pixels are given successively as in the case of the image signal obtained by scanning a document, it is not required to store the image signal of the target pixel until the image signals of distant pixels are given. Therefore, it is possible to discriminate the region represented by the image signal obtained by scanning a document without requiring a large memory capacity.

Alternatively, in order to discriminate that the target pixel, which is one of the pixels constituting the image, exists in which of different regions including the character region and the halftone dot region, the image processing apparatus in accordance with the present invention may have an arrangement including:

(1) a block memory for storing local image data which indicates a local block composed of the target pixel and a plurality of pixels surrounding the target pixel;

(2) succession feature parameter calculating means which includes the following (a) to (c);

(a) a main direction calculating section for calculating, with respect to a binary image prepared by binarizing the pixels in a local block with a predetermined threshold value, the maximum value of the numbers of succeeding pixels having equal value per main line along the main direction, and determining the sums of the calculated values per at least one main line succeeding in the sub direction so as to determine a difference of the maximum value and the minimum value of the sums, (b) a sub direction calculating section for calculating, with respect to the binary image, the maximum value of the numbers of succeeding pixels having equal value per sub line along the sub direction, and determining the sums of the calculated values per at least one sub line succeeding in the main direction so as to determine a difference of the maximum value and the minimum value of the sums, and (c) an output section for outputting the maximum value of the outputs of the main direction calculating section and the sub direction calculating section, as a variable of the succession feature parameter; and (3) discriminating means for outputting region discrimination information for discriminating that the region including the target pixel is which region type of the different regions.

Also, the image processing apparatus in accordance with the present invention may include maximum density difference feature parameter calculating means for calculating the difference between the maximum value and the minimum value of the signal levels of the entire pixels of the local block based on the local image data so as to give the calculated value as a variable of the maximum density difference feature parameter to the discriminating means.

In this arrangement, the discriminating means generates the region discrimination information in accordance with the variable of the maximum density difference feature parameter and the variable of the succession feature parameter. In general, in the halftone dot region, the difference between the maximum value and the minimum value, namely, the variable of the maximum density difference feature parameter tends to be smaller than that in the character region, and this becomes prominent as the number of lines in the halftone dot region increases. However, the image processing apparatus of the present invention ensures that the halftone dot region having a small number of lines and the character region are discriminated using the succession feature parameter. As a result, in the image processing apparatus, it is ensured that the halftone dot region and the character region are discriminated regardless of the number of lines, thus improving the discrimination accuracy.

Further, the image processing apparatus in accordance with the present invention may include complexity feature parameter calculating means for, with respect to the local image data, (i) calculating a difference in signal level of two succeeding pixels in the main direction in the local block, (ii) determining the sum of differences in signal level in the local block, (iii) determining the sum of differences in signal level with respect to pixels succeeding in the sub direction, and (iv) giving, as a variable of the complexity feature parameter, the minimum value of the sums in the main direction and in the sub direction to the discriminating means.

In this arrangement, the discriminating means generates the region discrimination information in accordance with a combination of the variable of the complexity feature parameter and the variable of the succession feature parameter. In general, in the halftone dot region, a density change between adjacent pixels is frequent compared with the character region, and the variable of the complexity feature parameter tends to be larger than that of the character region. This becomes prominent as the number of lines in the halftone dot region increases. However, the image processing apparatus of the present invention ensures that the halftone dot region having a small number of lines and the character region are discriminated using the succession feature parameter. As a result, in the image processing apparatus, it is ensured that the halftone dot region and the character region are discriminated regardless of the number of lines, thus improving the discrimination accuracy.

In the photographic region, the maximum density difference feature parameter and the complexity feature parameter are smaller than that in the character region and the halftone dot region. Thus, when the image processing apparatus is provided with respective feature parameter calculating means for maximum density difference, complexity, and succession, and the discriminating means generates the region discrimination information in accordance with all combinations of the maximum density difference parameter, the complexity parameter, and the succession parameter, the image processing apparatus is capable of generating the region discrimination information which can discriminate, in addition to the character region and the halftone dot region, the photographic region.

Further, the image processing apparatus in accordance with the present invention, in addition to the arrangement including the complexity feature parameter calculating means, may have an arrangement wherein the main direction and the sub direction are substantially orthogonal to each other, and the complexity feature parameter calculating means further calculates the sum of the differences in signal level with respect to diagonal directions different from the main direction and the sub direction so as to output the minimum value of the sums in the main direction, the sub direction, and the diagonal directions.

With this arrangement, in the local block, the variable of the complexity feature parameter is increased not only when the edge component is included in the main direction and the sub direction but also when the edge component is included in the diagonal directions. As a result, the discrimination accuracy for the character region having the edge component in the diagonal directions is further improved.

Note that, the number and the degree of slope of the diagonal directions with respect to the main direction and the sub direction are not limited as long as the diagonal directions are directed differently from the main direction and the sub direction. However, when the right diagonal 45° direction and the left diagonal 45° direction are adopted as the diagonal directions, the directions of detecting the edge component are situated evenly. As a result, the discrimination accuracy for the character region is further increased.

Incidentally, in the case where the variable of the succession feature parameter is calculated based on a single main line and a single sub line, the size of feature parameters is limited by the length of each line. As a result, the difference of feature parameters between the character region and the halftone dot region is reduced, and this increases the possibility that the character region and the halftone dot region are discriminated erroneously.

In order to solve this problem, it is preferable that the main direction calculating section calculates the sum of calculated maximum values per not less than two main lines, and the sub direction calculating section calculates the sum of calculated maximum values per not less than two sub lines.

Generally, as the resolution of image is increased, the occurrence that the thickness of characters and line drawings exceeding two pixels is increased. In such a case, the maximum values of the numbers of succeeding pixels having equal density tend to be close between succeeding plural lines.

Thus, when the variable of the succession feature parameter is calculated with respect to succeeding plural lines, compared with the case where the variable of the succession feature parameter is calculated with respect to a single line, the difference between the variable of the succession feature parameter of the character region and the variable of the halftone dot region can be increased. As a result, the character region and the halftone dot region can be distinguished from each other with more ease, and the discrimination accuracy of the image processing apparatus is further improved.

Incidentally, for example, in the disclosure of Japanese Unexamined Patent publication No. 147860/1987 (Tokukaisho 62-147860), when discriminating a region including the target pixel in accordance with variables of a plurality of feature parameters, a certain threshold value is set beforehand with respect to each feature parameter, and the image processing apparatus categorizes the feature parameters by individually comparing each feature parameter with the threshold value. When the feature parameters are categorized per each feature parameter in this manner, the feature parameters are often categorized erroneously. It is also difficult to set an appropriate threshold value for each feature parameter. Therefore, even when the number of feature parameters is increased, it is difficult to obtain sufficient discrimination accuracy.

In contrast, in the present invention, the discriminating means selects the regions of different image types by providing boundaries having non-linear characteristics in a multi-dimensional space having axes of the feature parameters inputted, and outputs the region discrimination information in accordance with the variable of each feature parameter.

In this arrangement, the discriminating means discriminates regions multi-dimensionally using a plurality of feature parameters. Thus, compared with the case of categorizing the feature parameters per each feature parameter, the discrimination accuracy is improved.

Note that, the discriminating means selects the region type including the character region and the halftone dot region by providing boundaries having non-linear characteristics in a multi-dimensional space having axes of the feature parameters inputted. The boundaries are non-linear, and it is extremely difficult to represent the boundaries by equations calculating circuit (referred to as right diagonal difference value calculating circuit hereinafter) 41c and a left diagonal 45° direction difference value sum calculating circuit (referred to as left diagonal difference value calculating circuit hereinafter) 41d for calculating the sums of difference values with respect to a right diagonal 45° direction and a left diagonal 45° direction, respectively. The comparator 42 outputs, as a variable of the second feature parameter $P_2$, a minimum value of respective outputs of the difference value calculating circuits 41a through 41d.

In the above arrangement, the edge component in the diagonal directions is detected by the right diagonal difference value calculating circuit 41c and the left diagonal difference value calculating circuit 41d. Therefore, even when the local block includes the edge component not only in the main scanning direction and the sub scanning direction but also in the diagonal directions, the variable of the second feature parameter $P_2$ is increased. As a result, the discrimination accuracy for the character region including an edge component in the diagonal direction is further improved.

Note that, in the present embodiment, as the diagonal directions, two directions of right diagonal 45° direction and left diagonal 45° direction are adopted; however, as long as the diagonal directions are different from the main scanning direction and the sub scanning direction, the number and the degree of slope of the diagonal directions are not limited. Nevertheless, when the right diagonal 45° direction and the left diagonal 45° direction are adopted as the diagonal directions, the directions of detecting the edge component are situated evenly. This allows the discrimination accuracy for the character region to be further improved.

[Third Embodiment]

In First and Second Embodiment, the explanations are given through the case where the image processing apparatus outputs region discrimination information of a region including each pixel. In contrast, in the present embodiment, explanations will be given through the case where the image processing apparatus further carries out a spacial filtering process as an example of an image process which is carried out based on the region discrimination information.

Figure 12:
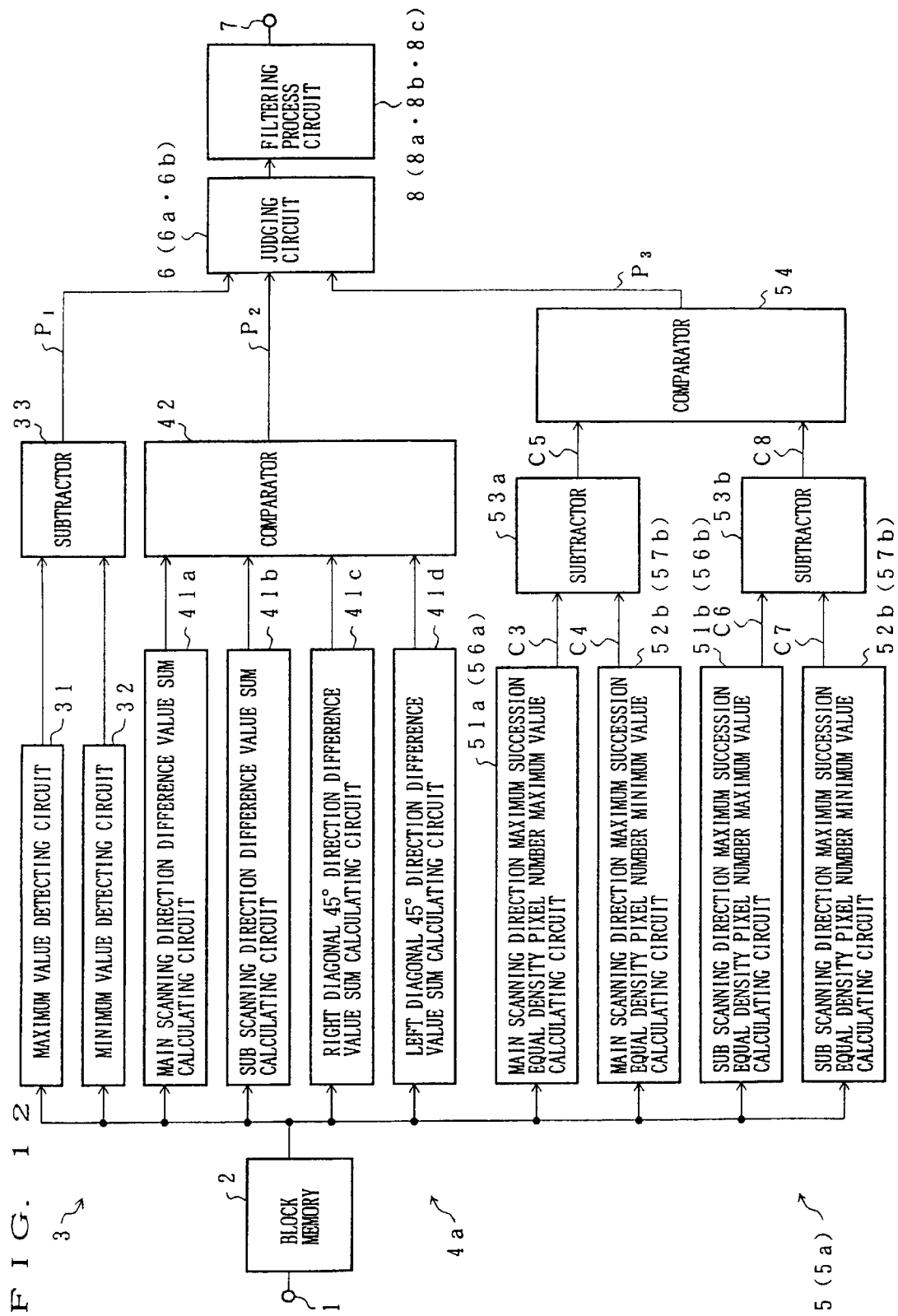
FIG. 12 is a block diagram showing main components of an image processing apparatus in accordance with still another embodiment of the present invention.

Specifically, as shown in FIG. 12, in addition to the structure of FIG. 11, the image processing apparatus in accordance with the present embodiment is further provided with a filtering process circuit (filtering means) 8 for subjecting an image signal to spacial filtering in accordance with the instruction from the judging circuit 6. Note that, FIG. 12 shows a structure wherein the filtering process circuit 8 is additionally provided in the structure of FIG. 11. However, a similar effect can be obtained by additionally providing the filtering process circuit 8 in the structure of FIG. 1.

Figure 13:
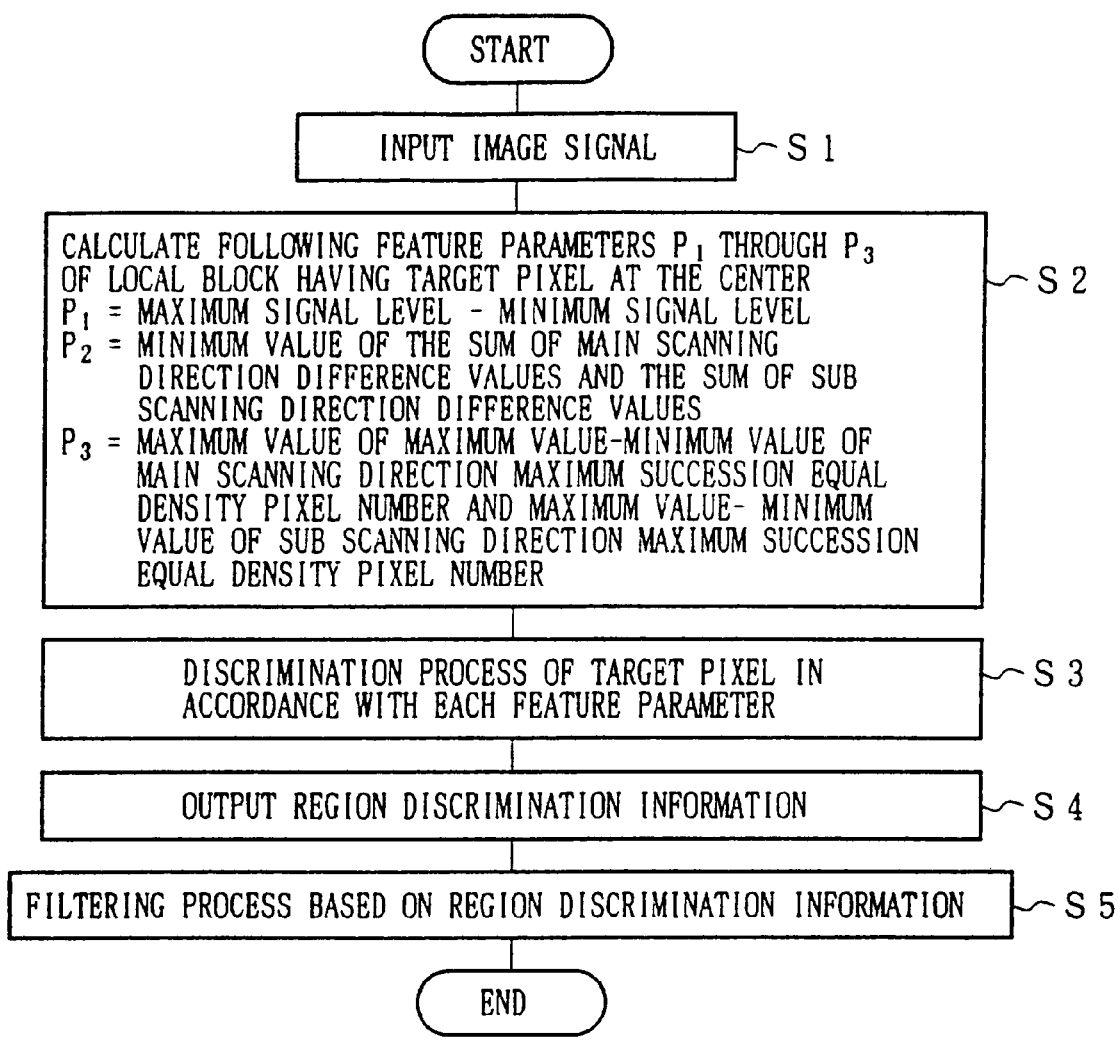
FIG. 13 is a flowchart showing an operation of the image processing apparatus.

The following briefly describes the operation of the image processing apparatus having the above arrangement referring to the flowchart of FIG. 13. In the present embodiment, after S4 of FIG. 6, a new step S5 is added. As in FIG. 6, when respective variables of the first through third feature parameters $P_1$ through $P_3$ are calculated with respect to a local block having the target pixel at the center, a discrimination process for the target pixel is carried out in S3 based on each variable. Then, in the new step S5, the filtering process circuit 8 changes the filter to be used in accordance with the output value (region discrimination information determined in S4) of the judging circuit 6 so as to subject the image signal to a filtering process.

The steps of S2 to S5 are carried out consecutively per each target pixel. As a result, compared with the case of setting a block beforehand, it is possible to improve the discrimination accuracy, and to carry out an optimum filtering process in accordance with each target pixel.

The following will describe in more detail filter coefficients used in the filtering process circuit 8 and a method of setting the filter coefficients. For example, as in the case of the judging circuit 6a of FIG. 7, in the case of outputting the discrimination signal Oa, namely, when the judging circuit 6 selects that the target pixel exists in which of the character region, the photographic region, and the halftone dot region, a filtering process circuit 8a described below is used.

Specifically, when the discrimination signal Oa indicating that the target pixel exists in the character region is outputted, the filtering process circuit 8a subjects the image signal to an enhancement process using, for example, an enhancement filter having filter coefficients as shown in FIG. 14. As a result, the edges of the image are enhanced, and characters and line drawings appear sharper. When the discrimination signal Oa is indicating a halftone dot region, the image signal is subjected to a smoothing process, for example, with a smoothing filter having filter coefficients of FIG. 15. The filter coefficients are set so as to suppress the frequency component of the halftone dots. As a result, moire is prevented from generating in the halftone dot region. When the discrimination signal Oa is indicating the photographic region, the image signal is outputted without being subjected to the filtering process.

Note that, the filtering process circuit 8a may have an arrangement wherein the smoothing filter and the enhancement filter respectively having the above filter coefficients are provided, and the two filters are switched in accordance with the discrimination signal Oa. Also, when the filter processing circuit 8a can change the filter coefficients as in the case where the filter processing circuit 8a is realized by execution of a predetermined program by a CPU, the filter coefficients as selected in accordance with the discrimination signal Oa may be set. When the filtering process circuit 8a can change the filter coefficients to be used for filtering of the image signal in accordance with the discrimination signal Oa, the same effect can be obtained.

On the other hand, for example, in the judging circuit 6b of FIG. 10, as the filtering process beforehand.

In contrast, the discriminating means in accordance with the present invention includes a learned neural network which outputs, for example, in response to input of variables of the feature parameters, region discrimination information corresponding to the inputted feature parameters.

Generally, the neural network has plural inputs, and even when desired input-output characteristics are non-linear and cannot be represented by equations, by repetitive learning, the neural network can be adjusted to have desired input-output characteristics relatively easily. As a result, compared with the case where the equations representing the boundaries are specified beforehand, it is possible to realize significantly high accurate discriminating means with relative ease.

Note that, in particular, in the case where a high processing speed is demanded for the image processing apparatus, the discriminating means is provided with, instead of the neural network, a look-up table storing beforehand values indicative of region discrimination information in accordance with combinations of the feature parameters. The values stored in the look-up table are determined, for example, in accordance with the input-output characteristics of the neural network which has learned beforehand. In this arrangement, the values indicative of region discrimination information in accordance with the combinations of the feature parameters are stored beforehand in the look-up table. This allows the discriminating means to output the region discrimination information significantly rapidly in accordance with the combinations of feature parameters referring to the look-up table. As a result, the image processing apparatus can carry out a highly accurate discrimination process real time.

Also, it is possible that the discriminating means calculates, per each type of the region, the probability that the target pixel exists, and outputs, as the region discrimination information, a value indicative of the likelihood of each type of the region, such as the likelihood of the character region and the likelihood of the halftone dot region.

Note that, the likelihood of each region type can be calculated in numbers relatively accurately and with ease by using, for example, the neural network and a look-up table reflecting the input-output characteristics of the neural network.

In this arrangement, the discriminating means outputs the degree of likelihood that the region including the target pixel is the character region or the halftone dot region. As a result, the discriminating means can send more delicate instructions to means for processing an inputted image, for example, means for carrying out spacial filtering, which is provided on the following stage of the discriminating means.

Therefore, the means provided on the following stage of the discriminating means can adjust various coefficients in accordance with the likelihood of each region type, and can carry out more delicate image processing in accordance with each pixel. Also, the means on the following stage of the discriminating means is capable of selecting a process for pixels which cannot be discriminated, such as a combined process of the enhancement process and smoothing process based on information that it is difficult to specify the region. As a result, it is possible to prevent deterioration of image due to discrimination error, thus realizing an image processing apparatus with higher image quality.

It is also possible that the discriminating means selects the type of the region including the target pixel, and outputs, as the region discrimination information, a discrimination signal indicative of the selected region.

In this arrangement, since the discriminating means only selects the region type, compared with the case where a value indicative of region type is outputted, the circuit structure of the discriminating means is simplified. Also, the means on the following stage of the discriminating means selects the content of image processing in accordance with the discrimination signal. As a result, an image processing apparatus capable of faster processing is realized.

Incidentally, the image processing apparatus in accordance with the present invention may be further provided with filtering means for carrying out a spacial filtering process with respect to the target pixel in accordance with the region discrimination information.

With this arrangement, since the discriminating means has significantly high discriminating accuracy, the filtering means can subject each pixel to the spacial filtering process with optimum filter coefficients for each region type without considering the discrimination error. As a result, the image quality of the image outputted from the image processing apparatus can be improved.

Note that, the filter coefficients of the filtering means can be set by various methods. For example, it is possible that the discriminating means selects the region type of the region including the target pixel, and outputs a discrimination signal indicative of the selected region as the region discrimination information, and that the filtering means carries out a spacial filtering process with filter coefficients which are selected from predetermined filter coefficients in accordance with the discrimination signal.

However, in order to improve the image quality, it is preferable that the discriminating means calculates, per each region type, the probability that the target pixel exists, and outputs as the region discrimination information a value indicative of each region type of, for example, the character region and the halftone dot region, and the filtering means carries out a filtering process with filter coefficients which have been calculated in accordance with the value indicative of each region type.

With this arrangement, the filtering means can adjust the filter coefficients based on region discrimination information indicative of each region type. This enables delicate image processing in accordance with each target pixel. Especially, when it is difficult to categorize the region including the target pixel to be any of the regions, for example, in the case where the likelihood of each region type is substantially the same, the filtering means can carry out a filtering process suitable for the pixels which cannot be discriminated, such as a filtering process with a combination of enhancement process and filtering process. Thus, deterioration of image due to discrimination error is prevented. As a result, the image quality is further improved.

A recording medium in accordance with the present invention records a program for calculating discrimination information for discriminating that a target pixel, which is one of pixels constituting an image, exists in which image region of a character region and a halftone dot region, and records a program for carrying out the following steps.

Namely, the program is for carrying out the steps of: (1) calculating, per main line along the main direction, with respect to a binary image which has been prepared by binarizing the pixels in the local block with a predetermined threshold value, the maximum value of the numbers of succeeding pixels having equal value, and determining the sum of calculated values per at least one main line succeeding in the sub direction, so as to determine a difference of the maximum value and the minimum value of the sums; (2) calculating, per sub line along the sub direction, with respect to the binary image, the maximum value of the numbers of succeeding pixels having equal value, and determining the sum of calculated values per at least one sub line succeeding in the main direction, so as to determine a difference of the maximum value and the minimum value of the sums; (3) calculating the maximum value of the differences determined in the step (1) and in the step (2) as a variable of the succession feature parameter; and (4) calculating the region discrimination information of the region including the target pixel.

Upon execution of this program, the region discrimination information of the region including the target pixel is calculated in accordance with the variable of the succession feature parameter. As a result, it is ensured that the halftone dot region having a small number of lines and the character region are discriminated, thereby improving the discrimination accuracy for the target pixel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:

a main direction calculating section for calculating a first line maximum value, per main line along a predetermined main direction, with respect to a binary image prepared by binarizing with a predetermined threshold value image data of a local block composed of a target pixel, which is one of pixels constituting an image, and a plurality of pixels surrounding the target pixel, the first line maximum value being a largest number of succeedingly arranged pixels having an equal value in the predetermined main direction in the local block so as to determine a difference between a main maximum value which is the largest first line maximum value and a main minimum value which is the smallest first line maximum value;

a sub direction calculating section for calculating a second line maximum value, per sub line along a sub direction different from the main direction, with respect to the binary image, the second line maximum value being a largest number of succeedingly arranged pixels having an equal value in the sub direction so as to determine a difference between a sub maximum value which is the largest second line maximum value and a sub minimum value which is the smallest second line maximum value;

an output section for outputting, as a variable of a succession feature parameter, larger of differences respectively outputted from said main direction calculating section and said sub direction calculating section; and discriminating means for outputting region discrimination information for discriminating that the target pixel exists in which region of different image types of the character region and the halftone dot region in accordance with an output of said output section.

2. The image processing apparatus as set forth in claim 1, wherein said main direction calculating section includes a sum calculating section for adding the first line maximum value per not less than two main lines so as to determine a sum of first line maximum values.

3. The image processing apparatus as set forth in claim 1, wherein said sub direction calculating section includes a sum calculating section for adding the second line maximum value per not less than two sub lines so as to determine a sum of second line maximum values.

4. The image processing apparatus as set forth in claim 1, further comprising:

maximum density difference feature parameter calculating means for determining, with respect to all pixels in the local block, (i) a maximum value (Amax) and a minimum value (Amin) of an image signal representing the image and (ii) a difference (B) of the maximum value (Amax) and the minimum value (Amin) so as to give, as a variable of a maximum density difference feature parameter, the difference (B) to said discriminating means.

5. The image processing apparatus as set forth in claim 1, further comprising:

complexity feature parameter calculating means for (i) sequentially calculating differences (C) of an image signal representing the image between two succeedingly arranged pixels in the main direction in the local block, (ii) determining a sum (D) of the differences (C) calculated, (iii) determining a sum (E) of the differences (C) with respect to pixels succeeding in the sub direction, and (iv) determining a minimum value (Fmin) of the sum (D) and the sum (E), so as to give, as a variable of a complexity feature parameter, the minimum value (Fmin) to said discriminating means.

6. The image processing apparatus as set forth in claim 4, further comprising:

complexity feature parameter calculating means for (i) sequentially calculating differences (C) of the image signal representing the image between two succeedingly arranged pixels in the main direction in the local block, (ii) determining a sum (D) of the differences (C) calculated, (iii) determining a sum (E) of the differences (C) with respect to pixels succeeding in the sub direction, and (iv) determining a minimum value (Fmin) of the sum (D) and the sum (E), so as to give, as a variable of the complexity feature parameter, the minimum value (Fmin) to said discriminating means.

7. The image processing apparatus as set forth in claim 5, wherein said complexity feature parameter calculating means includes a calculating section for (i) determining a sum (G) of the differences (c) with respect to pixels succeedingly arranged in a diagonal direction different from the main direction and the sub direction and (ii) determining a minimum value (Hmin) of the sums (D), (E), and (G) so as to give, as a variable of the complexity feature parameter, the minimum value (Hmin) to said discriminating means.

8. The image processing apparatus as set forth in claim 7, wherein the main direction and the sub direction are substantially orthogonal to each other.

9. The image processing apparatus as set forth in claim 8, wherein the diagonal direction is inclined 45° with respect to the main direction and the sub direction.

10. The image processing apparatus as set forth in claim 4, wherein said discriminating means includes a judging circuit for dividing a multi-dimensional space having axes of feature parameters including the succession feature parameter and the maximum density difference feature parameter into regions respectively corresponding to the different image types by providing boundaries having non-linear characteristics in the multi-dimensional space so as to discriminate a region to which the target pixel belongs from regions of different image types in accordance with respective variables of at least the succession feature parameter and the maximum density difference feature parameter.

11. The image processing apparatus as set forth in claim 6, wherein said discriminating means includes a judging circuit for dividing a multi-dimensional space having axes of feature parameters including the succession feature parameter, the maximum density difference feature parameter, and the complexity feature parameter into regions respectively corresponding to the different image types by providing boundaries having non-linear characteristics in the multi-dimensional space so as to discriminate a region to which the target pixel belongs from the regions of different image types in accordance with respective variables of at least the succession feature parameter, the maximum density difference feature parameter, and the complexity feature parameter.

12. The image processing apparatus as set forth in claim 10, wherein the judging circuit includes a neural network which has learned beforehand for outputting, in response to input of the respective variables of the succession feature parameter and the maximum density difference feature parameter, the region discrimination information in accordance with the respective variables.

13. The image processing apparatus as set forth in claim 11, wherein the judging circuit includes a neural network which has learned beforehand for outputting, in response input of the respective variables of the succession feature parameter, the maximum density difference feature parameter, and the complexity feature parameter, the region discrimination information in accordance with the respective variables.

14. The image processing apparatus as set forth in claim 10, wherein the judging circuit includes a look-up table, whose input-output characteristics are predetermined by a neural network, for outputting, in response to input of the respective variables of the succession feature parameter and the maximum density difference feature parameter, the region discrimination information in accordance with the respective variables.

15. The image processing apparatus as set forth in claim 11, wherein the judging circuit includes a look-up table, whose input-output characteristics are predetermined by a neural network, for outputting, in response input of the respective variables of the succession feature parameter, the maximum density difference feature parameter, and the complexity feature parameter, the region discrimination information in accordance with the respective variables.

16. The image processing apparatus as set forth in claim 4, wherein said discriminating means includes a judging circuit for calculating a value indicative of probability of an image type of the local block in accordance with respective variables of the succession feature parameter and the maximum density difference feature parameter.

17. The image processing apparatus as set forth in claim 6, wherein said discriminating means includes a judging circuit for calculating a value indicative probability of an image type of the local block in accordance with respective variables of the succession feature parameter, the maximum density difference feature parameter, and the complexity feature parameter.

18. The image processing apparatus as set forth in claim 1, wherein said discriminating means includes a judging circuit for outputting, as the region discrimination information, an discrimination signal indicative of an image region including the target pixel.

19. The image processing apparatus as set forth in claim 1, further comprising:
   filtering means for carrying out a filtering process with respect to the target pixel in accordance with the region discrimination information.

20. The image processing apparatus as set forth in claim 19, wherein said discriminating means includes a judging circuit for calculating, in accordance with the variable, a value indicative of probability that the target pixel exists in one of the regions of different image types,
   said filtering means carrying out a spacial filtering process with filter coefficients calculated in accordance with the value indicative of probability.

21. The image processing apparatus as set forth in claim 19, wherein said filtering means includes a filtering process circuit for changing the filter coefficients in accordance with the regions of different image types based on the region discrimination information.

22. The image processing apparatus as set forth in claim 21, wherein said filtering means includes a filtering process circuit for selecting, in a case where the discriminating means has a difficulty in judging that the target pixel exists in which region of different image types, filter coefficients having a combined filtering function for the regions of different image types.

23. The image processing apparatus as set forth in claim 1, further comprising:
   a block memory for storing the image data of the local block, said block memory provided on a preceding stage of said main direction calculating section and said sub direction calculating section.

24. The image processing apparatus as set forth in claim 1, wherein in a case where a photographic region is included in the regions of different image types, in a number of bits of data representing the region discrimination information, a number of bits for the photographic region is set to be smaller than a number of bits for the character region and the halftone dot region.

25. The image processing apparatus as set forth in claim 1, wherein said image processing apparatus is a digital copying machine.

26. The image processing apparatus as set forth in claim 1, wherein said image processing apparatus is a facsimile device.

27. The image processing apparatus as set forth in claim 1, wherein said image processing apparatus is a digital camera.

28. A computer-readable recording medium recording a program which calculates region discrimination information for discriminating that a target pixel, which is one of pixels constituting an image, exists in which of regions including a character region and a halftone dot region, said computer-readable recording medium recording a program for carrying out image processing which includes the steps of:

(1) calculating a first line maximum value, per main line along a predetermined main direction, with respect to a binary image prepared by binarizing with a predetermined threshold value image data of a local block composed of a target pixel and a plurality of pixels surrounding the target pixel, the first line maximum value being a largest number of succeedingly arranged pixels having an equal value in the predetermined main direction in the local block so as to determine a difference between a main maximum value which is the largest first line maximum value and a main minimum value which is the smallest first line maximum value;

(2) calculating a second line maximum value, per sub line along a sub direction different from the main direction, with respect to the binary image, the second line maximum value being a largest number of succeedingly arranged pixels having an equal value in the sub direction so as to determine a difference between a sub maximum value which is the largest second line maximum value and a sub minimum value which is the smallest second line maximum value;

(3) calculating, as a variable of the succession feature parameter, larger of differences respectively determined in said step (1) and in said step (2); and (4) generating the region discrimination information in accordance with the succession feature parameter.

* * * * *